US012792822B1

(12) United States Patent
Malters et al.

(10) Patent No.: US 12,792,822 B1
(45) Date of Patent: Nov. 10, 2026

(54) SELF-SERVICE STORY GENERATION

(71) Applicant: Amazon Technologies, Inc., Seattle, WA (US)

(72) Inventors: Joshua Noah Malters, Seattle, WA (US); Jiajun Cao, Issaquah, WA (US); Stephen Michael Ash, Seattle, WA (US); Gregory David Adams, Seattle, WA (US); Andrew Werth, Lake Forest Park, WA (US); Chris Elliott, Bainbridge Island, WA (US); Brodie A. O'Neil, Seattle, WA (US); Gregory Thomas Taleck, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 495 days.

(21) Appl. No.: 18/478,760

(22) Filed: Sep. 29, 2023

(51) Int. Cl.

| | |
|---|---|
| ***G06F 40/166*** | (2020.01) |
| ***G06F 40/137*** | (2020.01) |
| ***G06F 40/40*** | (2020.01) |
| ***G06N 20/00*** | (2019.01) |

(52) U.S. Cl.
CPC .......... *G06F 40/166* (2020.01); *G06F 40/137* (2020.01); *G06F 40/40* (2020.01); *G06N 20/00* (2019.01)

(58) Field of Classification Search
CPC ...... G06F 40/166; G06F 40/137; G06F 40/40; G06N 20/00
See application file for complete search history.

(56) References Cited

U.S. PATENT DOCUMENTS

| | | | | |
|---|---|---|---|---|
| 11,960,500 | B1 * | 4/2024 | Sboychakova | G06F 40/20 |
| 2022/0391729 | A1 * | 12/2022 | Duford | G06F 11/0745 |
| 2024/0346254 | A1 * | 10/2024 | Liu | G06F 16/90332 |
| 2025/0077549 | A1 * | 3/2025 | George | G06F 16/287 |
| 2025/0181420 | A1 * | 6/2025 | Talavera | G06F 9/5083 |
| 2025/0356218 | A1 * | 11/2025 | Khyatti | G06N 3/0475 |

* cited by examiner

*Primary Examiner* — Phuong H Nguyen
(74) *Attorney, Agent, or Firm* — Nicholson DeVos Webster & Elliott LLP

(57) ABSTRACT

Techniques for generating a multimedia presentation of a dataset using a data intelligence service are described. In some examples, an outline for the multimedia presentation using at least one machine learning language model is generated, the outline being generated according to a schema and using one or more of text from the request, insights regarding the dataset, and domain information about the dataset; content for the multimedia presentation of the dataset using at least one machine learning language model is predicted based at least in part on the outline, the domain information, and the text from the natural language request, wherein the content includes one or more of a visual and text for each section of the outline; and the generated content is presented as the multimedia presentation.

20 Claims, 18 Drawing Sheets

SELF-SERVICE STORY GENERATION

BACKGROUND

Data intelligence services enable users to understand their data and strengthen their data intelligence. These services may be scalable, serverless, embeddable, and/or machine learning (ML) powered. Data intelligence services publish dashboards that include ML powered insights.

BRIEF DESCRIPTION OF DRAWINGS

Various examples in accordance with the present disclosure will be described with reference to the drawings, in which.

DETAILED DESCRIPTION

The present disclosure relates to methods, apparatus, systems, and non-transitory computer-readable storage media for data intelligence including the generation of multimedia presentations and/or dashboard content.

Users of data intelligence services have sources of data and interpretations of that data available to them. However, finding relevant data in these sources can be difficult, if not impossible due to scale of the amount of data and the disparate sources of data. For example, a user of a data intelligence service may want to know how many instances of cancer claims have been made across the United States, that data may be in databases in different locations with different formats, visuals for that data may be spread across multiple dashboards and in different forms (e.g., a pie chart in one dashboard and a bar graph in another dashboard), etc. In some examples, visuals include one or more of text, chart, graph, etc.

A by-product of the data intelligence services configuration above is that users spend a lot of time extracting data and insights from a dashboard to create presentations for other stakeholders and they likely do not have the complete picture. To that end, they often end up copying and pasting visuals into various documents that are shared outside their system, where governance is no longer enforced, moreover, as insights, data etc. change at a rapid pace these presentations are quickly (if not nearly instantly) out-of-date. For example, a data intelligence service may have offered a "story" feature that allowed a user to manually select individual visuals. This feature did not include text about the visuals. The generation of these stories in a computerized tool is a problem that exists because of how data is stored and dashboarded in data intelligence services.

Detailed herein are examples of a data intelligence service capability for the generation of multimedia presentations from natural language queries. These presentations include visuals selected and text generated by the data intelligence service from the natural language query. In some examples, users enter the description of the story they want in natural language and presentations with visuals from relevant dashboards alongside text-based descriptions and analysis of the data are generated. These presentations help users interpret data and share insights through compelling narratives and do not require a user to have to manually find or generate visuals in multiple dashboards that may use different formats, etc. These examples improve the technical field of data intelligence.

Figure 1:
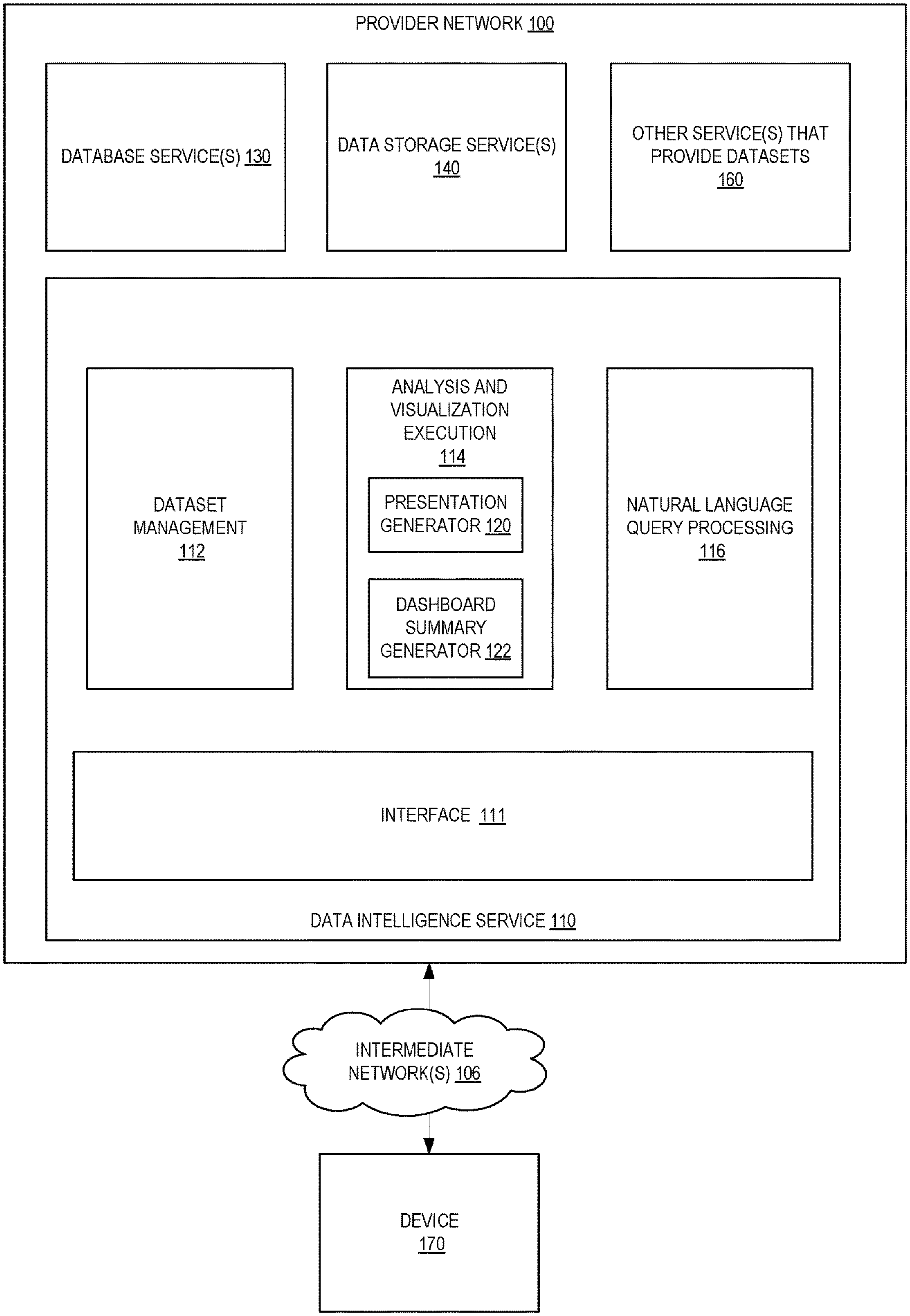
FIG. 1 illustrates a logical block diagram illustrating a provider network offering a data intelligence service that implements natural language query processing, including various data storage and processing services, according to some embodiments.

FIG. 1 illustrates a logical block diagram illustrating a provider network offering a data intelligence service that implements natural language query processing, including various data storage and processing services, according to some embodiments. Provider network 100 may be a private or closed system or may be set up by an entity such as a company or a public sector organization to provide one or more services (such as various types of cloud-based storage) accessible via the Internet and/or other networks to clients, in some embodiments. Provider network 100 may be implemented in a single location or may include numerous data centers hosting various resource pools, such as collections of physical and/or virtualized computer servers, storage devices, networking equipment and the like, needed to implement and distribute the infrastructure and services offered by the provider network 100. In some embodiments, provider network 100 may implement various computing systems, platforms, resources, or services, such as a data intelligence service 110, compute services, database service (s) 130, (e.g., relational or non-relational (NoSQL) database query engines, map reduce processing, data flow processing, and/or other large scale data processing techniques), data storage service(s) 140, (e.g., an object storage service, block-based storage service, or data storage service that may store different types of data for centralized access), data stream and/or event services, and other services 160 (any other type of network based services (which may include various other types of storage, processing, analysis, communication, event handling, visualization, and security services not illustrated), including other service(s) 160 that provide or generate data sets for access by data intelligence service 110.

In various embodiments, the components illustrated in FIG. 1 may be implemented directly within computer hardware, as instructions directly or indirectly executable by computer hardware (e.g., a microprocessor or computer system), or using a combination of these techniques. For example, the components of FIG. 1 may be implemented by a system that includes a number of computing nodes (or simply, nodes). In various embodiments, the functionality of a given system or service component (e.g., a component of data storage service 130) may be implemented by a particular node or may be distributed across several nodes. In some embodiments, a given node may implement the functionality of more than one service system component (e.g., more than one data store component).

In various embodiments, data intelligence service 110 may provide a scalable, serverless, and machine-learning powered service to create visualizations and analysis for data (e.g., dashboards) to include in various applications (e.g., websites) accessing various data sets, such as data stored in database services 130, data storage services 140, or other services 160. Data intelligence service 110 may implement interface 111, which may be implemented as various types of programmatic (e.g., Application Programming Interfaces (APIs)), command line, and/or graphical user interfaces to support the management of data sets for analysis, request, configure, and/or otherwise obtain new or existing analysis, and/or perform natural language queries, as discussed below.

Data intelligence service 110 may implement data set management 112, in various embodiments. Data set management 112 may allow users to upload, identify, describe, augment, annotate, or otherwise prepare data sets for access, analysis, and/or visualization by data intelligence service 110. For example, various requests to describe data, such as provide descriptions of columns, field values, or other information, which may be used enhance information that may be found in a data storage system (e.g., data in addition to a database schema or other table description).

Data intelligence service 110 may implement analysis and visualization 114, which may perform the various operations to access data, analyze data, and/or generate a corresponding visualization. For example, analysis and visualization 114 may understand and generate corresponding requests to obtain data from different database service(s) 130, data storage service(s) 140, or other service(s) 160 according to the corresponding interfaces supported by those services (e.g., query language, API, protocols, etc.). Analysis and visualization 114 may be able to perform various data processing operations to determine generate requested results (e.g., applying various aggregation, statistical analyses, or other operations). Analysis and visualization 114 may also be able to determine the type of visualization to provide the results (e.g., bar graphs, charts, or other displays, that illustrate the requested analysis.

In some examples, the analysis and visualization 114 allows for one or more of a presentation to be generated from data stored and/or managed by database service(s) 130 and/or data storage service(s) 140 using presentation generator 120 and/or a dashboard to be generated from one or both of those services using dashboard summary generator 122. Details of both generators are detailed below. In some examples, a summary includes text, highlighting (e.g., bold, bullet, etc.) of some text based on insights, a link to a portion of a dashboard, is generate by a schema, etc. In some examples, the summary is user configurable (e.g., whether or not to bullet, etc.). In some examples, the summary is configured in a user prescribed manner according to a natural language request.

Data intelligence service 110 may implement natural language query (NLQ) processing 116 to handle responses to natural language queries to perform analysis and visualization using data intelligence service, in some embodiments. In some examples, the NLQ processing is used as a front end to the analysis and visualization execution 114.

In various embodiments, database services 130 may be various types of data processing services that perform general or specialized data processing functions (e.g., analytics, big data querying, time-series data, graph data, document data, relational data, structured data, or any other type of data processing operation) over data that is stored across multiple storage locations, in some embodiments. For example, in at least some embodiments, database services 130 may include various types of database services (e.g., relational) for storing, querying, and updating data. Such services may be enterprise-class database systems that are scalable and extensible. Queries may be directed to a database in database service(s) 130 that is distributed across multiple physical resources, as discussed below, and the database system may be scaled up or down on an as needed basis, in some embodiments. The database system may work effectively with database schemas of various types and/or organizations, in different embodiments. In some embodiments, clients/subscribers may submit queries or other requests (e.g., requests to add data) in a number of ways, e.g., interactively via an SQL interface to the database system or via Application Programming Interfaces (APIs). In other embodiments, external applications and programs may submit queries using Open Database Connectivity (ODBC) and/or Java Database Connectivity (JDBC) driver interfaces to the database system.

In some embodiments, database services 130 may be various types of data processing services to perform different functions (e.g., query or other processing engines to perform functions such as anomaly detection, machine learning, data lookup, or any other type of data processing operation). For example, in at least some embodiments, database services 130 may include a map reduce service that creates clusters of processing nodes that implement map reduce functionality over data stored in one of data storage services 140. Various other distributed processing architectures and techniques may be implemented by database services 130 (e.g., grid computing, sharding, distributed hashing, etc.). Note that in some embodiments, data processing operations may be implemented as part of data storage service(s) 130 (e.g., query engines processing requests for specified data).

Data storage service(s) 140 may implement different types of data stores for storing, accessing, and managing data on behalf of clients as a network-based service that enables clients to operate a data storage system in a cloud or network computing environment. For example, one data storage service 130 may be implemented as a centralized data store so that other data storage services may access data stored in the centralized data store for processing and or storing within the other data storage services, in some embodiments. Such a data storage service 140 may be implemented as an object-based data store and may provide storage and access to various kinds of object or file data stores for putting, updating, and getting various types, sizes, or collections of data objects or files. Such data storage service(s) 130 may be accessed via programmatic interfaces (e.g., APIs) or graphical user interfaces. A data storage service 140 may provide virtual block-based storage for maintaining data as part of data volumes that can be mounted or accessed similar to local block-based storage devices (e.g., hard disk drives, solid state drives, etc.) and may be accessed utilizing block-based data storage protocols or interfaces, such as internet small computer interface (iSCSI).

In various embodiments, data stream and/or event services may provide resources to ingest, buffer, and process streaming data in real-time, which may be a source of data sets. In some embodiments, data stream and/or event services may act as an event bus or other communications/notifications for event driven systems or services (e.g., events that occur on provider network 100 services and/or on-premises systems or applications).

Generally speaking, clients may encompass any type of client configurable to submit network-based requests to provider network 100 via network 106, including requests for materialized view management platform (e.g., a request to create a materialized view from different data sources of the other provider network services and identify one or more as a target data source). For example, a given client may include a suitable version of a web browser, or may include a plug-in module or other type of code module that may execute as an extension to or within an execution environment provided by a web browser. Alternatively, a client may encompass an application such as a database application (or user interface thereof), a media application, an office application or any other application that may make use of resources in in provider network 100 to implement various features, systems, or applications. (e.g., to store and/or access the data to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client may be an application may interact directly with provider network 100. In some embodiments, client may generate network-based services requests according to a Representational State Transfer (REST)-style network-based services architecture, a document- or message-based network-based services architecture, or another suitable network-based services architecture.

In some embodiments, a client may provide access to provider network 100 to other applications in a manner that is transparent to those applications. For example, client may integrate with an operating system or file system to provide storage on one of data storage service(s) 140 (e.g., a block-based storage service). However, the operating system or file system may present a different storage interface to applications, such as a conventional file system hierarchy of files, directories and/or folders. In such an embodiment, applications may not need to be modified to make use of the storage system service model. Instead, the details of interfacing to the data storage service(s) 140 may be coordinated by client and the operating system or file system on behalf of applications executing within the operating system environment.

Clients (such as device 170) may convey network-based services requests (e.g., natural language queries) to and receive responses from provider network 100 via network 106. In various embodiments, network 106 may encompass any suitable combination of networking hardware and protocols necessary to establish network-based-based communications between clients and provider network 100. For example, network 106 may generally encompass the various telecommunications networks and service providers that collectively implement the Internet. Network 106 may also include private networks such as local area networks (LANs) or wide area networks (WANs) as well as public or private wireless networks. For example, both a given client and provider network 100 may be respectively provisioned within enterprises having their own internal networks. In such an embodiment, network 106 may include the hardware (e.g., modems, routers, switches, load balancers, proxy servers, etc.) and software (e.g., protocol stacks, accounting software, firewall/security software, etc.) necessary to establish a networking link between given client and the Internet as well as between the Internet and provider network 100. It is noted that in some embodiments, clients may communicate with provider network 100 using a private network rather than the public Internet.

A provider network 100 (or, "cloud" provider network) provides users with the ability to use one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources can be provided as services, such as a hardware virtualization service that can execute compute instances, a storage service that can store data objects, etc. The users (or "customers") of provider networks 100 can use one or more user accounts that are associated with a customer account, though these terms can be used somewhat interchangeably depending upon the context of use. Users can interact with a provider network 100 across one or more intermediate networks 106 (e.g., the internet) via one or more interface(s), such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) can be part of, or serve as a front-end to, a control plane of the provider network 100 that includes "backend" services supporting and enabling the services that can be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a geographical area in which the cloud provider clusters data centers. Each region includes multiple (e.g., two or more) availability zones (AZs) connected to one another via a private high-speed network, for example a fiber communication connection. An AZ (also known as a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

Users can connect to an AZ of the cloud provider network via a publicly accessible network (e.g., the Internet, a cellular communication network), e.g., by way of a transit center (TC). TCs are the primary backbone locations linking users to the cloud provider network and can be collocated at other network provider facilities (e.g., Internet service providers (ISPs), telecommunications providers) and securely connected (e.g., via a VPN or direct connection) to the AZs. Each region can operate two or more TCs for redundancy. Regions are connected to a global network which includes private networking infrastructure (e.g., fiber connections controlled by the cloud provider) connecting each region to at least one other region. The cloud provider network can deliver content from points of presence (or "POPs") outside of, but networked with, these regions by way of edge locations and regional edge cache servers. This compartmentalization and geographic distribution of computing hardware enables the cloud provider network to provide low-latency resource access to users on a global scale with a high degree of fault tolerance and stability.

To provide these and other computing resource services, provider networks 100 often rely upon virtualization techniques. For example, virtualization technologies can provide users the ability to control or use compute resources (e.g., a "compute instance," such as a VM using a guest operating system (O/S) that operates using a hypervisor that might or might not further operate on top of an underlying host O/S, a container that might or might not operate in a VM, a compute instance that can execute on "bare metal" hardware without an underlying hypervisor), where one or multiple compute resources can be implemented using a single electronic device. Thus, a user can directly use a compute resource (e.g., provided by a hardware virtualization service) hosted by the provider network to perform a variety of computing tasks. Additionally, or alternatively, a user can indirectly use a compute resource by submitting code to be executed by the provider network (e.g., via an on-demand code execution service), which in turn uses one or more compute resources to execute the code—typically without the user having any control of or knowledge of the underlying compute instance(s) involved.

As described herein, one type of service that a provider network may provide may be referred to as a "managed compute service" that executes code or provides computing resources for its users in a managed configuration. Examples of managed compute services include, for example, an on-demand code execution service, a hardware virtualization service, a container service, or the like.

An on-demand code execution service (referred to in various examples as a function compute service, functions service, cloud functions service, functions as a service, or serverless computing service) can enable users of the provider network 100 to execute their code on cloud resources without having to select or manage the underlying hardware resources used to execute the code. For example, a user can use an on-demand code execution service by uploading their code and use one or more APIs to request that the service identify, provision, and manage any resources required to run the code. Thus, in various examples, a "serverless" function can include code provided by a user or other entity—such as the provider network itself—that can be executed on demand. Serverless functions can be maintained within the provider network by an on-demand code execution service and can be associated with a particular user or account or can be generally accessible to multiple users/accounts. A serverless function can be associated with a Uniform Resource Locator (URL), Uniform Resource Identifier (URI), or other reference, which can be used to invoke the serverless function. A serverless function can be executed by a compute resource, such as a virtual machine, container, etc., when triggered or invoked. In some examples, a serverless function can be invoked through an application programming interface (API) call or a specially formatted HyperText Transport Protocol (HTTP) request message. Accordingly, users can define serverless functions that can be executed on demand, without requiring the user to maintain dedicated infrastructure to execute the serverless function. Instead, the serverless functions can be executed on demand using resources maintained by the provider network 100. In some examples, these resources can be maintained in a "ready" state (e.g., having a pre-initialized runtime environment configured to execute the serverless functions), allowing the serverless functions to be executed in near real-time.

Figure 2:
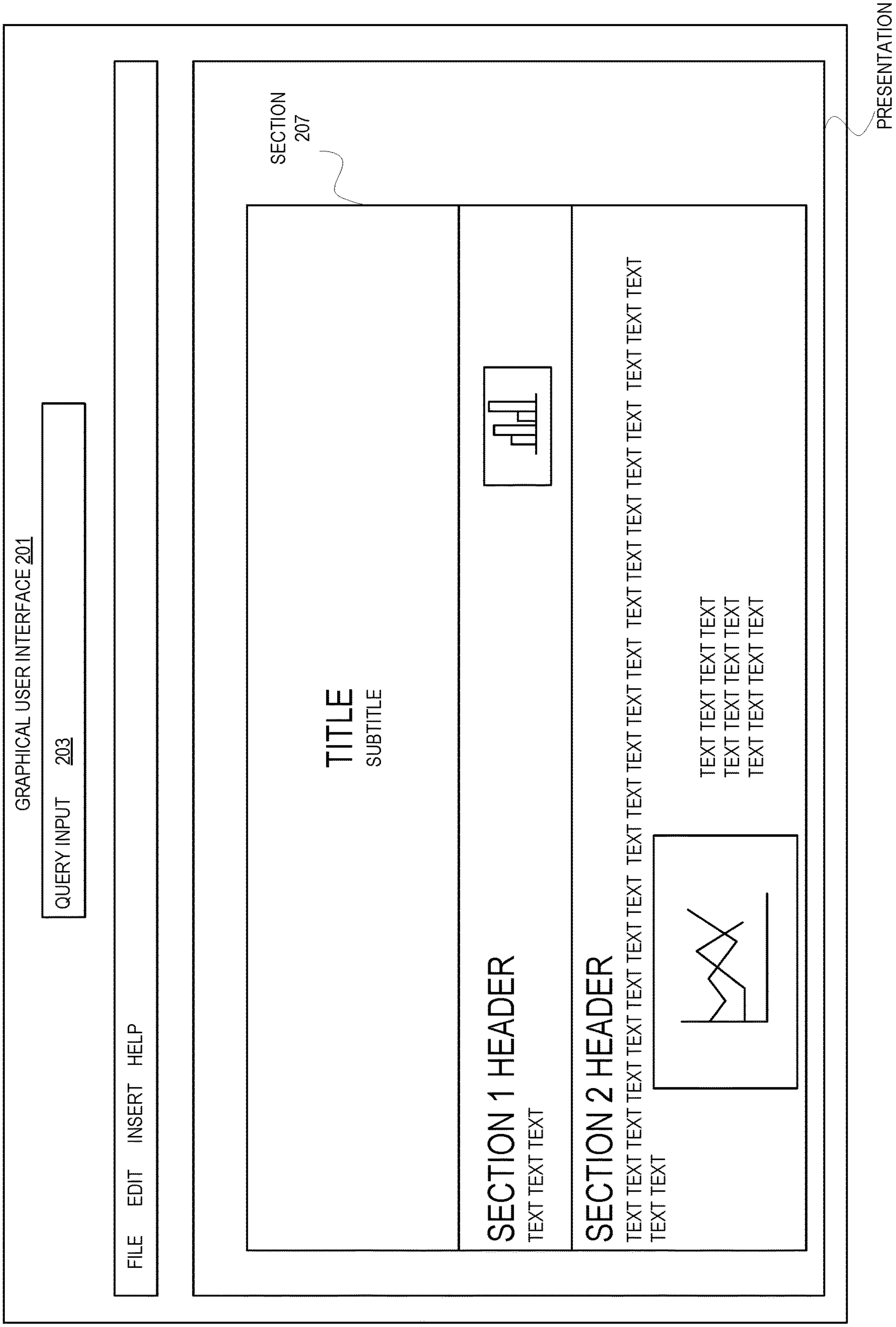
FIG. 2 illustrates examples of a graphical user interface for the generation, viewing, and/or editing of a multimedia presentation from stored data.

FIG. 2 illustrates examples of a graphical user interface for the generation, viewing, and/or editing of a multimedia presentation from stored data. The graphical user interface (GUI) 201 may include a query input mechanism 203, access to a toolbar (e.g., file, edit, etc.), a presentation 205, etc.

In some examples, a user is able to use a query input mechanism 203 to request that a multimedia presentation be made from stored data. A request using this mechanism may include one or more of natural language query text (e.g., text such as "Build me a presentation using my data about how we can improve computer resource usage for handling voice calls from customers using different models based on time, cost, and latency" or "Generate a presentation about how our medical resources are impacted by holidays, time of day, weather, and age of patient."), an indication of one or more datasets and/or visuals to use (note that this may be inferred from the NLQ text instead of being explicitly indicated and may be called a context identifier (ID) in other figures), an indication of a number of sections to generate for the presentation, an outline of the presentation, an indication of a style, a title, an indication of if a visual should be included in a section, n, etc. In other examples, the request for a presentation to be made is in a different input mechanism (an example of a different input mechanism is illustrated in FIG. 3 and FIG. 4).

In some examples, a presentation 205 includes a plurality of sections (the title section is numbered as section 207). Each section may include one or more of a header, text, and/or one or more visuals. The sections may be generated based on the request or manually added.

In some examples, a presentation 205 is editable by a user. For example, a user may change the text in a section. In some examples, edits to text triggers a new visual to be generated (similarly, edits to a visual triggers a new text).

Figure 3:
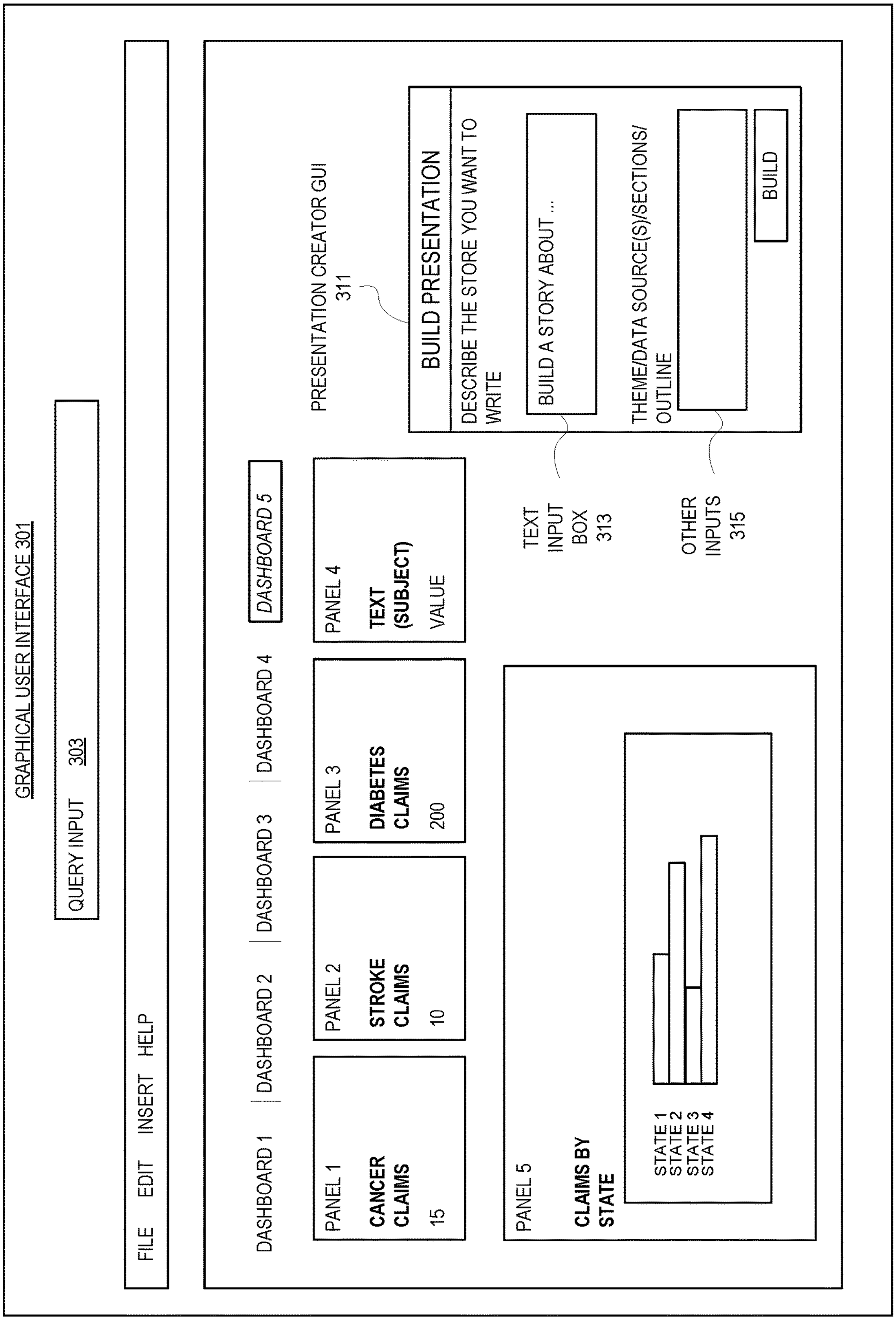
FIG. 3 illustrates examples of a graphical user interface for the generation, viewing, and/or editing of a multimedia presentation from stored data.
Figure 4:
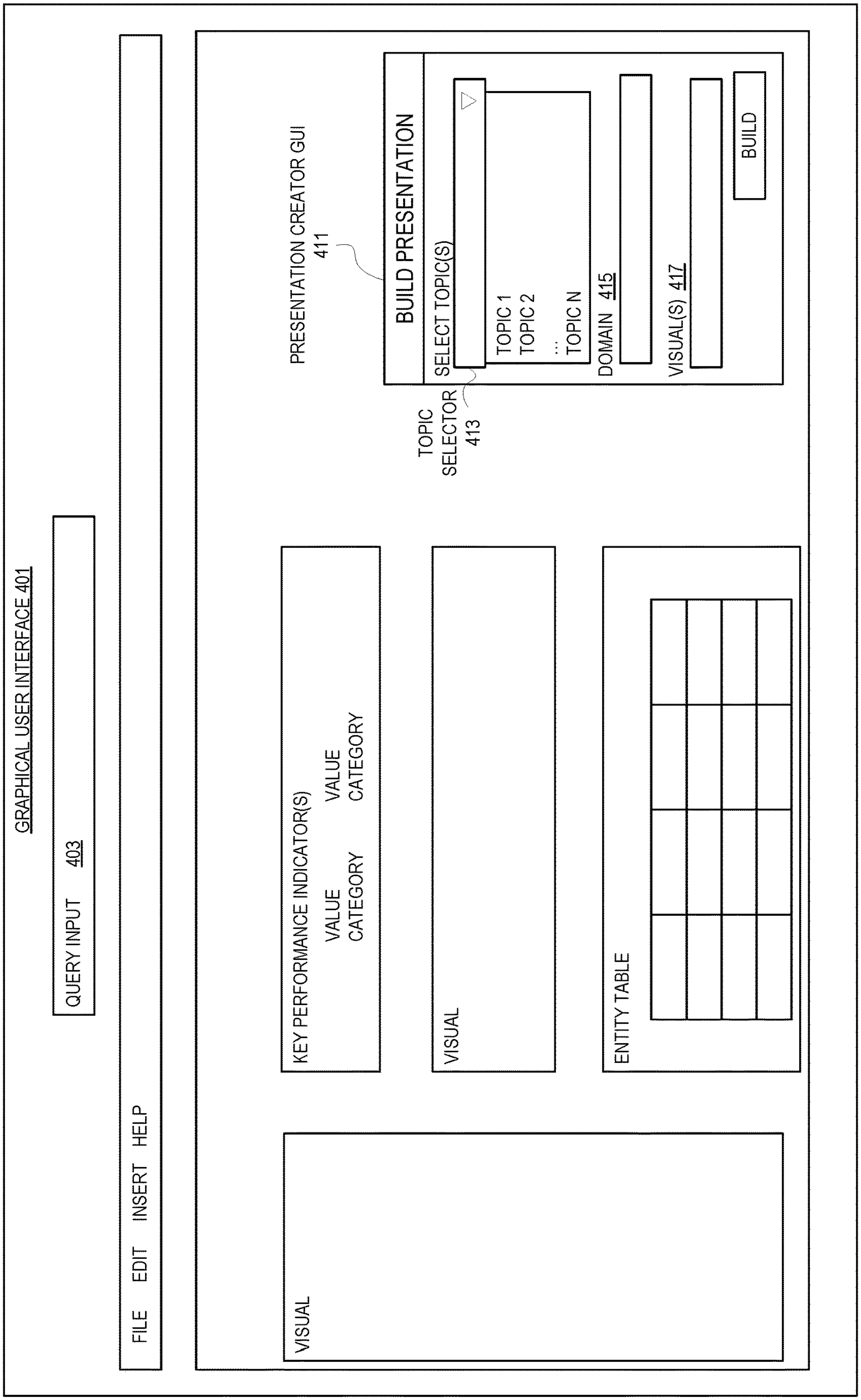
FIG. 4 illustrates examples of a graphical user interface for the generation, viewing, and/or editing of a multimedia presentation from stored data.

FIG. 3 illustrates examples of a graphical user interface for the generation, viewing, and/or editing of a multimedia presentation from stored data. The graphical user interface (GUI) 301 may include a query input mechanism 303, access to a toolbar (e.g., file, edit, etc.), a presentation 305, etc. In this example, a user may use a presentation creator GUI 311 to request a presentation be built.

The presentation creator GUI 311 includes a text input box 304 for a request to be made. A request using this mechanism may include one or more of a natural language query text (e.g., text such as "Build me a presentation using my data about how we can improve computer resource usage for handling voice calls from customers using different models based on time, cost, and latency" or "Generate a presentation about how our medical resources are impacted by holidays, time of day, weather, and age of patient."), an indication of one or more datasets and/or visuals to use (note that this may be inferred from the NLQ text instead of being explicitly indicated and may be called a context identifier (ID) in other figures), an indication of a number of sections to generate for the presentation, an indication of a style, a title, an indication of if a visual should be included in a section, an outline for the presentation, etc.

In some examples, one or more other inputs 315 are present. For example, a user may input one or more of a theme, data source(s), section information, an indication of an outline to use, etc.

FIG. 4 illustrates examples of a graphical user interface for the generation, viewing, and/or editing of a multimedia presentation from stored data. The graphical user interface (GUI) 401 may include a query input mechanism 403, access to a toolbar (e.g., file, edit, etc.), a presentation 405, etc. In this example, a user may use a presentation creator GUI 11 to request a presentation be built.

The presentation creator GUI 411 includes a topic selection mechanism 413 (e.g., a dropdown) to select one or more topics to be included in the presentation. In some examples, one or more other inputs are present such as an input for a domain 415, an input for one or more visuals to include 417, etc.

Figure 5:
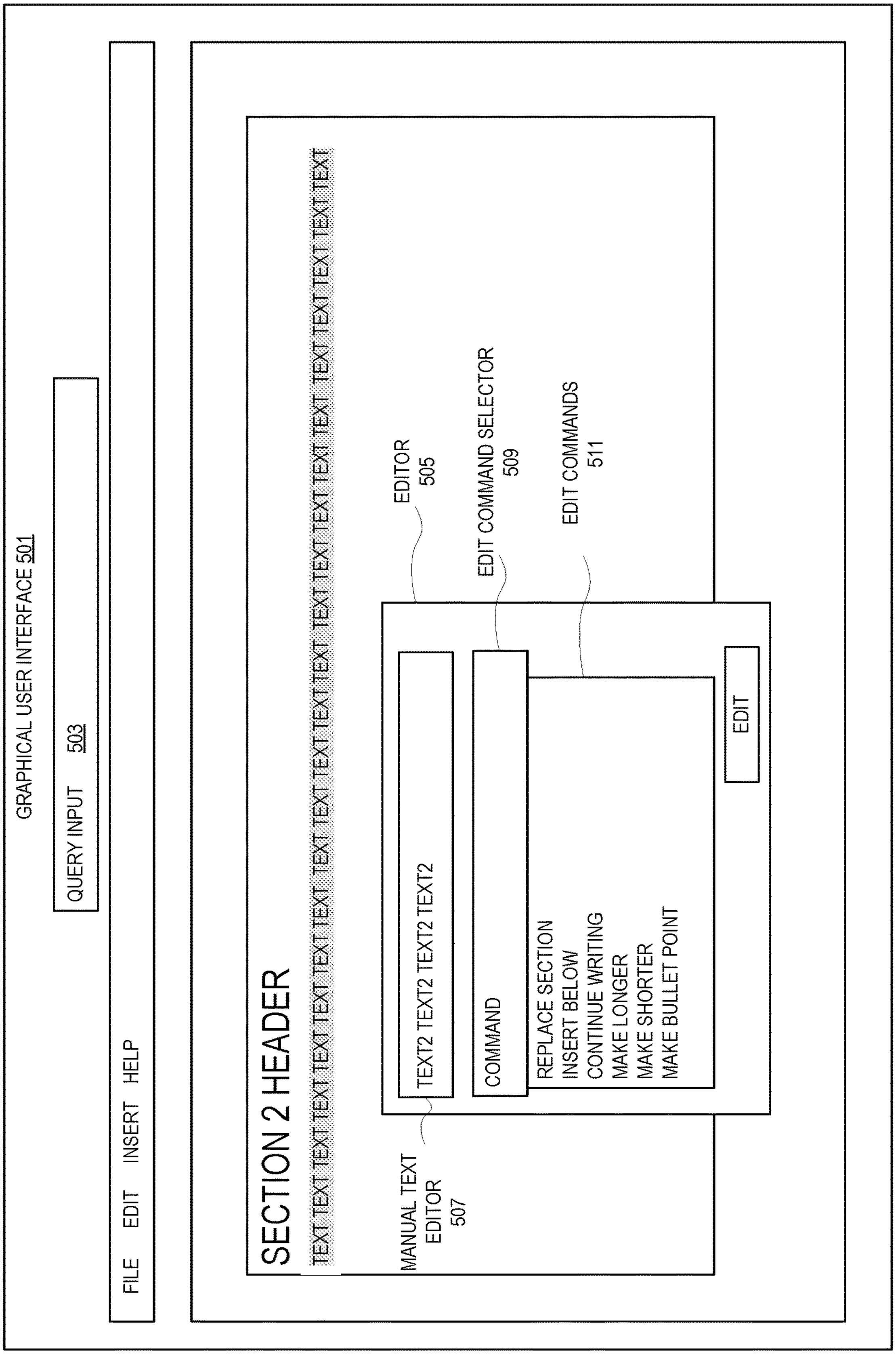
FIG. 5 illustrates examples of a graphical user interface for the generation, viewing, and/or editing of a multimedia presentation from stored data.

FIG. 5 illustrates examples of a graphical user interface for the generation, viewing, and/or editing of a multimedia presentation from stored data. The graphical user interface (GUI) 501 may include a query input mechanism 503, access to a toolbar (e.g., file, edit, etc.), an editor 505, etc. In this example, a user may use an editor GUI 505 to edit a presentation.

In this example, the user has selected text of a particular section to edit. The user may manually edit the text (e.g., using manual text editor input 507 to change the text) and/or use one or more machine learning models to generate new text using an edit command selector 509. Examples of commands 511 may include, but are not limited to replacing a section (where the entire section is replaced with new text and visual(s), insert additional text (e.g., added user text), continue writing text (e.g., have a model start with the existing text, but add more to it), make the text longer (have a model expand on the text such as elaborating on one or more points), make the text shorter (e.g., have a model compress the text (in some examples how much to shorten the text is provided by a user)), make the text bullet point (e.g., have a model make the text into a bullet point format), etc.

Figure 6:
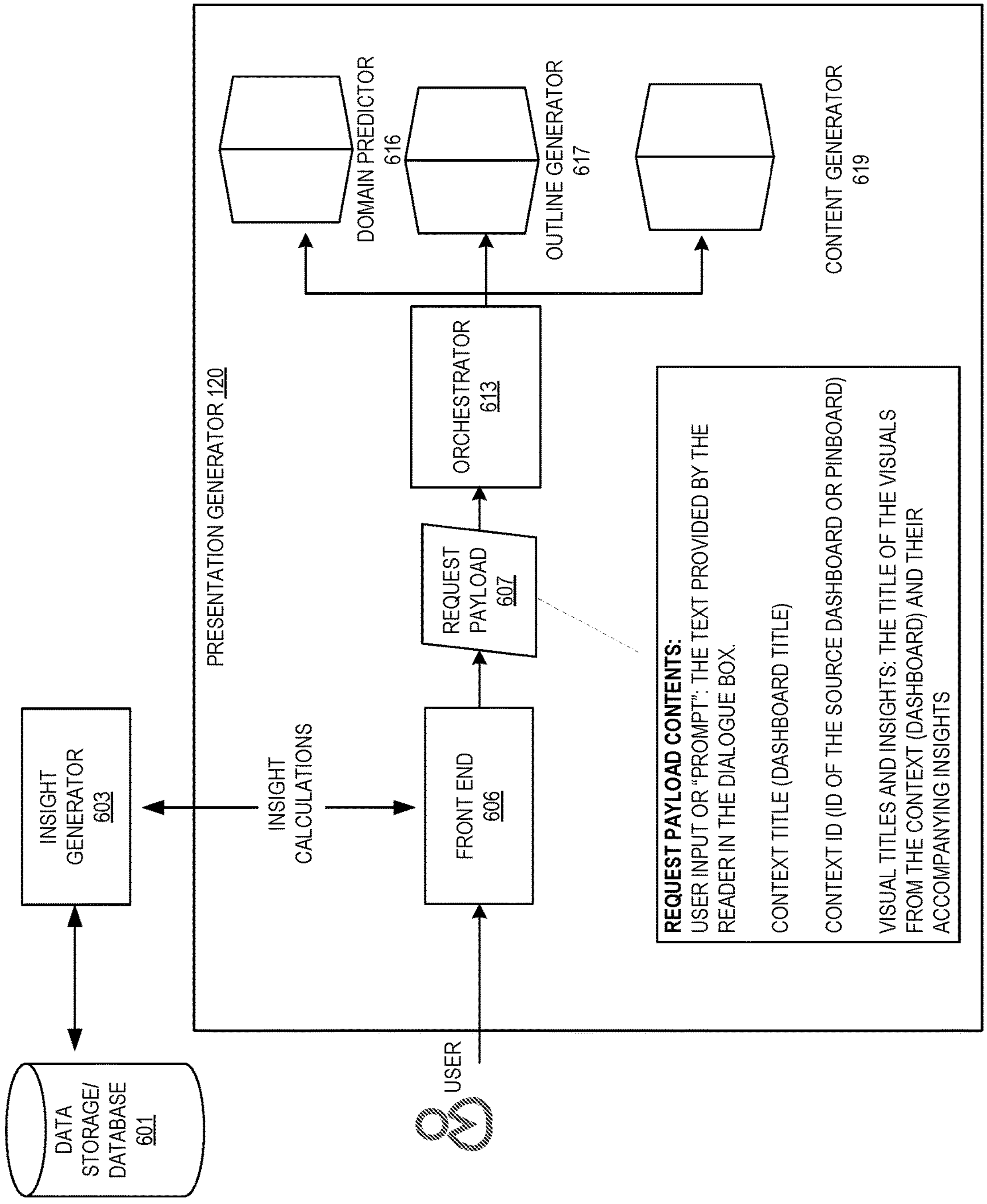
FIG. 6 illustrates examples of a presentation generator.

FIG. 6 illustrates examples of a presentation generator. In some examples, the presentation generator is presentation generator 120. As illustrated, a user interacts with a front end 606 to provide some input text. For example, text input into a query input, a presentation creator GUI, etc. The front end 606 uses that input to have insights about data (stored in data storage and/or database 601) generated using insight generator 603 (for example, the insight generator 603 may translate a user request into a SQL query to query the data storage/database 601). The insights may be used to generate various result displays (e.g., various charts, graphs, or other visualizations of data that answers the natural language query). Insights are computation results that provide additional relevant data points. Examples of calculable insights may include, but are not limited to anomaly detection against query results, bottom k categorical values, bottom movers that are the bottom k dimension values that decreased the most over a period of time, forecast insight, forecast data series over a period, growth rate for a period, maximum value over a query period, a metric comparison between two metrics for a time period, a minimum value over a query period, a period over period indicating a changing in a metric over a period, a period to date indicating a change in a metric over a most recent and immediately preceding period, top k categorical values, top movers that are the top k dimension values that increase the most over a period of time, a total aggregate value of a metric, a count of unique values, etc.

In some examples, the front end 606 uses the natural language query processing system 116 to generate intent representations which are then used by the insight generator 603 to generate the appropriate queries, requests, or other interactions. An intent representation may include the dataset to access along with various information to generate a result such as various metrics to be determined for the natural language query from the dataset (e.g., including functions such as aggregation, like SUM, operands for the function), a group by list, filters to apply, among other features to perform the natural language query.

In some examples, data storage and/or database 601 corresponds to one or more of the database service(s) 130 and/or data storage service(s) 140.

The front end 606 generates a request payload 607 from the user input, a context title, a context identifier, titles for visuals, and/or insights. An orchestrator 613 calls a domain predictor model 616 to predict a domain. In particular, the domain predictor model 616 infers a space of knowledge that the user dataset is operating in. For example, the domain predictor model 616 may that a user is in the domain of "Cloud Computing." The predicted dataset domain can be used in a prompt (e.g., textual input provided to a model (e.g., language model, large language model (LLM). Transformer-based model, attention-based model, decoder-based text prediction model, etc.) for the generation of personalized and targeted content. In some examples, a user provides the domain and no prediction is performed. In some examples, the domain predictor model 616 takes in one or more of a user prompt string (e.g., text), an indication of one or more context titles (e.g., Context Title(s): LIST [STRING]), a summary, and/or an indication of one or more visual titles (e.g., Visual Titles: LIST[STRING]). The domain predictor model 616 output is the predicted domain. The domain predictor model 616 is a classifier (e.g., long short-term memory (LSTM), Naïve Bayes, Support Vector Machine (SVM), a convolutional neural network (CNN), etc.).

With the domain information, the orchestrator 613 calls an outline generator 617 to generate an outline to serve as a roadmap for organizing information. In particular, an outline allows for the creation of a plot line (chunks) for a story. Each chunk can then have its own LLM ML prompt to generate content. Chunking content creation allows for variances in prompts and for individual sections to be re-worked as needed (either manually or applying an LLM). In some examples, the generation of an outline includes the application of chained ML model applications.

Figure 7:
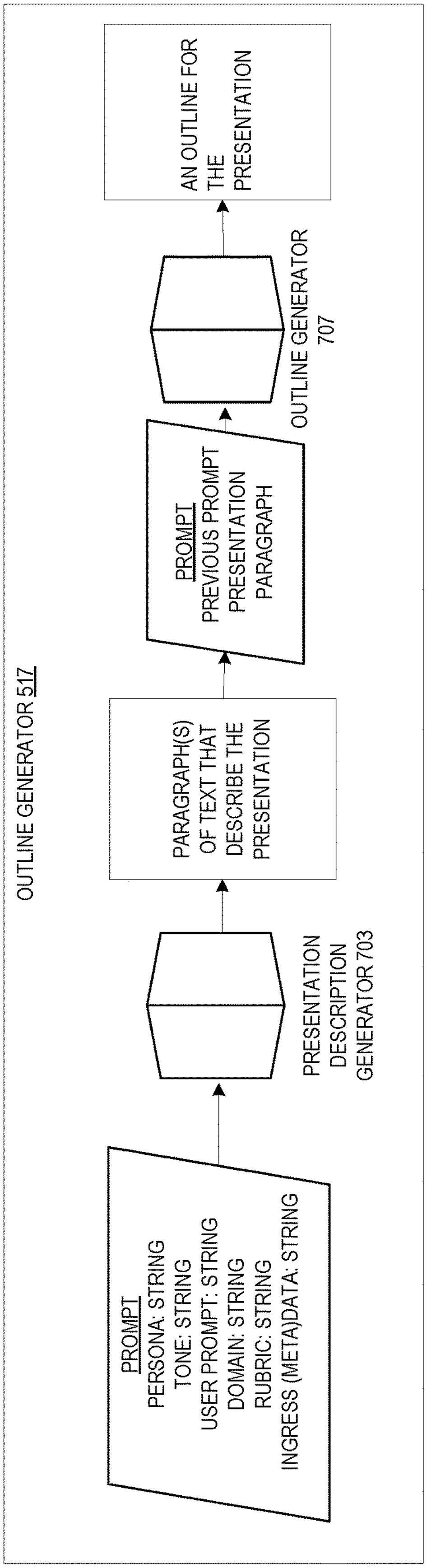
FIG. 7 illustrates examples of an outline generator.

FIG. 7 illustrates examples of an outline generator. In some examples, the generation of an outline is a result of at least two applications of LLMs. In some examples, the presentation description generator model 703 and the outline generator 707 are the same model. In some examples, the presentation description generator model 703 and the outline generator 707 are the same model. In the discussion below, the description is based on what the output is.

A first application (presentation description generator model 703) takes in a prompt that includes one or more of the text from a user, an indication of tone, an indication of a persona, the predicted domain, contextual ingress (meta) data (such as visual titles, a dashboard summary, cell data, etc.) for a story launch point, and an indication of a rubric to use. The presentation description generator model 703 generates a description of a presentation to be generated. In some examples, the description comprises one or more paragraphs of text.

This description and the prompt input into the presentation description generator model 703 to generate an outline. As noted above, an outline is a collection of sections according to a schema. An example section has one or more of the following components:

Section Number and Title: STRING

Objective: STRING #What the goal of this section is

Graph: NULLABLE[STR]#A description of graph that fits this section, or None for no Content: STRING #An example string of content. This is not the final content Description of a visual: STRING The section component "content" is where the outline can be used to generate a sample of content that is fitting for this section. For example, a prompt would look like "given this objective, these insights, and example text of 'blah' generate content having one visual and text." Note that the prompt in some examples uses zero or few examples. The separating of the generation of an outline into two applications of ML models allows for more control over the outputs of each model application.

The orchestrator 613 uses the outline, user prompt, and domain to call a content generator 619 to generate a story title, select a visual, and/or generate text for a section. The content generation may be broken into several acts. Note that content is generated per section.

Figure 8:
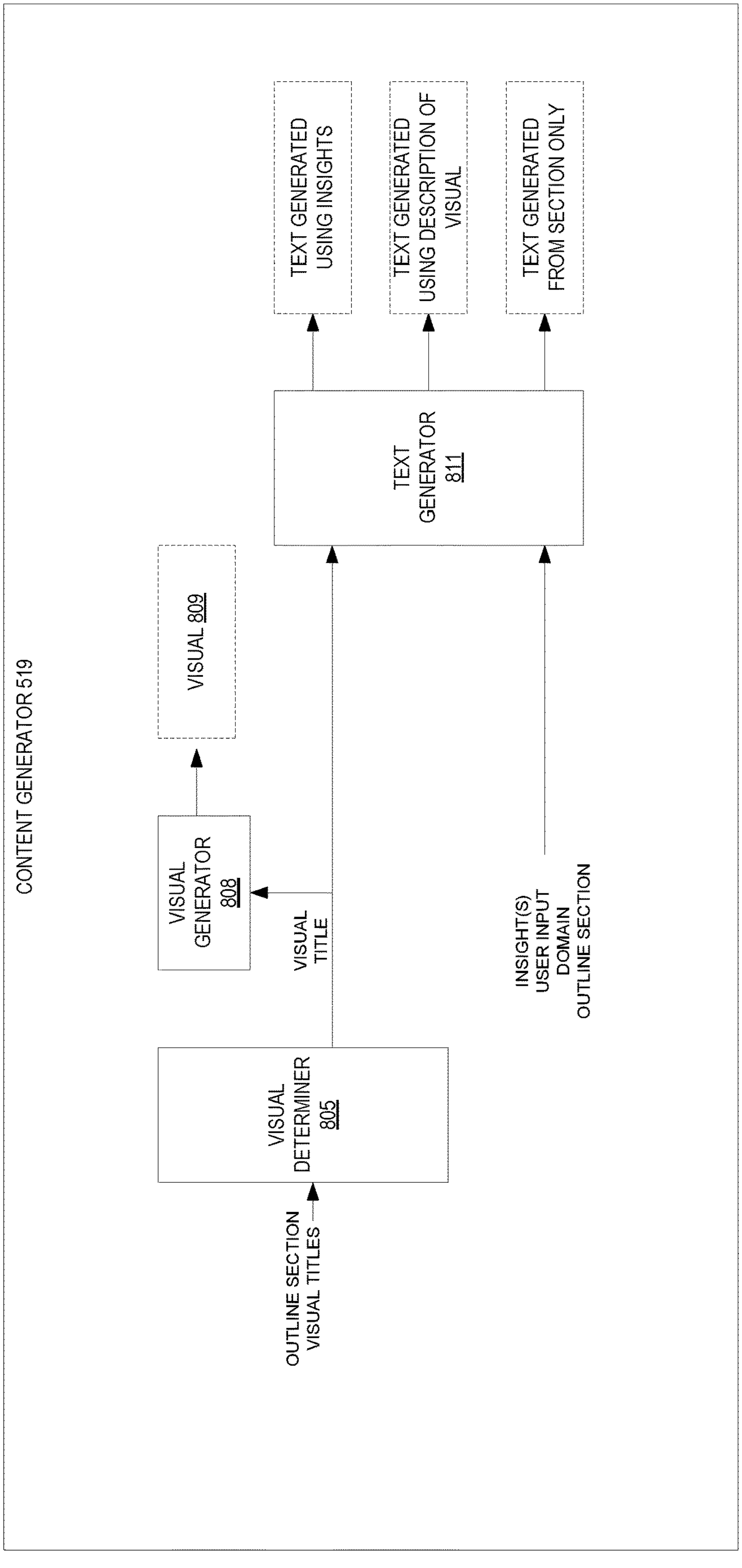
FIG. 8 illustrates examples of a content generator.

FIG. 8 illustrates examples of a content generator. A visual determiner 805 takes in the outline section which is to have content generated and determines when visual is needed. For example, did the outline indicate that a graph (visual) is to be included. If there is a visual its title is provided to visual generator 808 which generates or selects an existing visual 809.

One or more of the visual title, insights, the user input, the domain, and the outline section are provided to a text generator 811 (e.g., an LLM). In some examples, the text generator 811 is the LLM of the outline generator 517. Generating content after the visual is chosen allows for more fluidity in text generation by meshing the section's objective with actual chart and data.

The text generator 811 generates text using insights when provided with a visual title and insights. When no visual is chosen, the text generator 811 generates text using a description of a visual and/or any other information from the request. When no visual is to be present, the text generator 811 generates text based on the outline section only.

Figure 9:
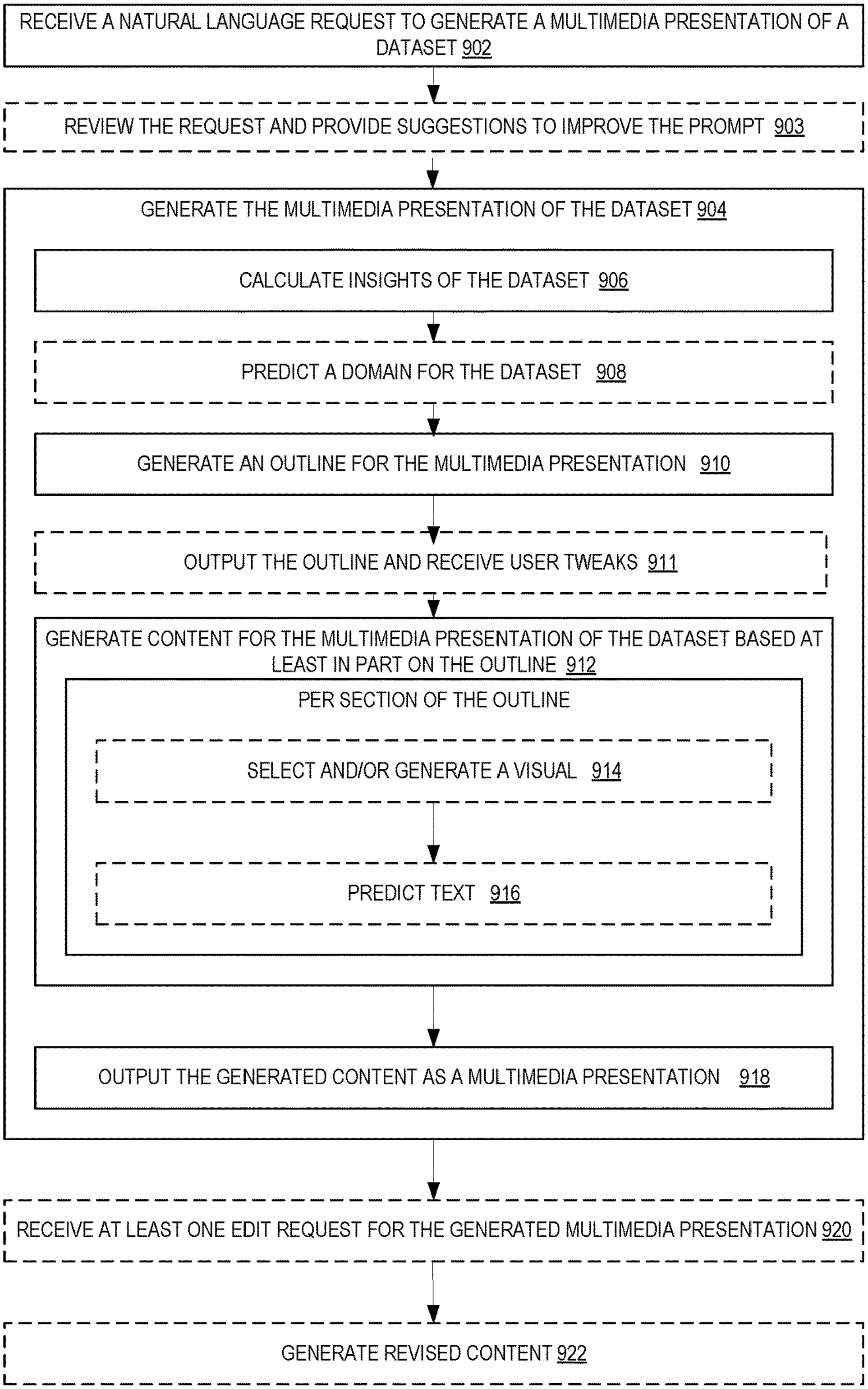
FIG. 9 is a flow diagram illustrating operations of a method for at least generating a multimedia presentation according to some examples.

FIG. 9 is a flow diagram illustrating operations of a method for at least generating a multimedia presentation according to some examples. Some or all of the operations (or other processes described herein, or variations, and/or combinations thereof) are performed under the control of one or more computing devices configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations are performed by the presentation generator 120 of the other figures.

A natural language request to generate a multimedia presentation of a dataset is received at 902. The request may include one or more of: natural language query text (e.g., text such as "Build me a presentation using my data about how we can improve computer resource usage for handling voice calls from customers using different models based on time, cost, and latency" or "Generate a presentation about how our medical resources are impacted by holidays, time of day, weather, and age of patient."), an indication of one or more datasets and/or visuals to use (note that this may be inferred from the NLQ text instead of being explicitly indicated and may be called a context identifier (ID) in other figures), an indication of a number of sections to generate for the presentation, an outline of the presentation, an indication of a style, a title, an indication of if a visual should be included in a section, a theme, data source(s), section information, an indication of an outline to use, etc.

In some examples, the request is reviewed and suggestions for improving the request are provided at 903. For example, a check is performed to determine if the request can be answered. If it cannot be answered, suggestions on topics that could be answered are provided.

A multimedia presentation of the dataset is generated at 904. This generation may have several acts.

Insights of the dataset are calculated at 906. Example insights have been detailed above.

A domain is predicted for the dataset, if not provided, at 908.

An outline for the multimedia presentation is generated at 910. In some examples, the generation is performed using at least one LLM—first to predict one or more paragraphs of text that describe the multimedia presentation and second to generate an outline using those paragraphs.

In some examples, the outline is output to a user and user tweaks are received and applied at 911. For example, a user may move content around, provide an indication of a specific visual to use, etc.

Content for the multimedia presentation of the dataset is generated based at least in part on the outline at 912. The content may include a visual and/or text. The visual is generated or selected from an existing set of visuals at 914.

The text to be predicted is dependent upon the visual (or a description of a visual) or the outline's exclusion thereof. In some examples, text is predicted using at least one LLM at 916. In some examples, each section of the outline has its content generated independently.

The generated content is output as a multimedia presentation at 918. For example, the generated content is displayed on a GUI. In some examples, the generated content is stored for later viewing.

In some examples, at least one edit request for the generated multimedia presentation is received at 920. For example, a user may use a GUI to edit one or more sections of the generated multimedia presentation. The edits may be to the text and/or the visual(s).

In some examples, revised content (e.g., a new visual, an updated visual, additional text, edited text, etc.) is generated according to the edit request at 922. In some examples, the revision follows the process for generating content 912.

In some examples, the data intelligence service 110 provides one or more dashboards showing trends, insights, and metrics of interest. Users of the data intelligence service 110 log into their dashboard from time-to-time to check recent trends, updated insights, and outliers of metrics of interest. The use of a dynamically updating dashboard in a data intelligence service is a computer-based problem without a human analog.

In some examples, the dashboard includes a summary that is dynamically generated to provide an overall executive summary of the dashboard with a listing of the "important" (or desired) insights. In some examples, the generation of this summary utilizes insight generation and/or one or more LLMs.

While a summary of "important" insights is beneficial, it may not tell the entire story to a user. For example, visuals, underlying data, etc. may change over time. In some examples, the summary indicates what has changed, if anything, since the last time the dashboard was viewed. This may be in addition to, or in lieu of, the normal summary. This allows a user to see not only the current data and visuals but provides a user with a summary of what has changed allowing a user to quickly understand any deltas. These examples of change summaries improve the technical field of data intelligence.

Figure 10:
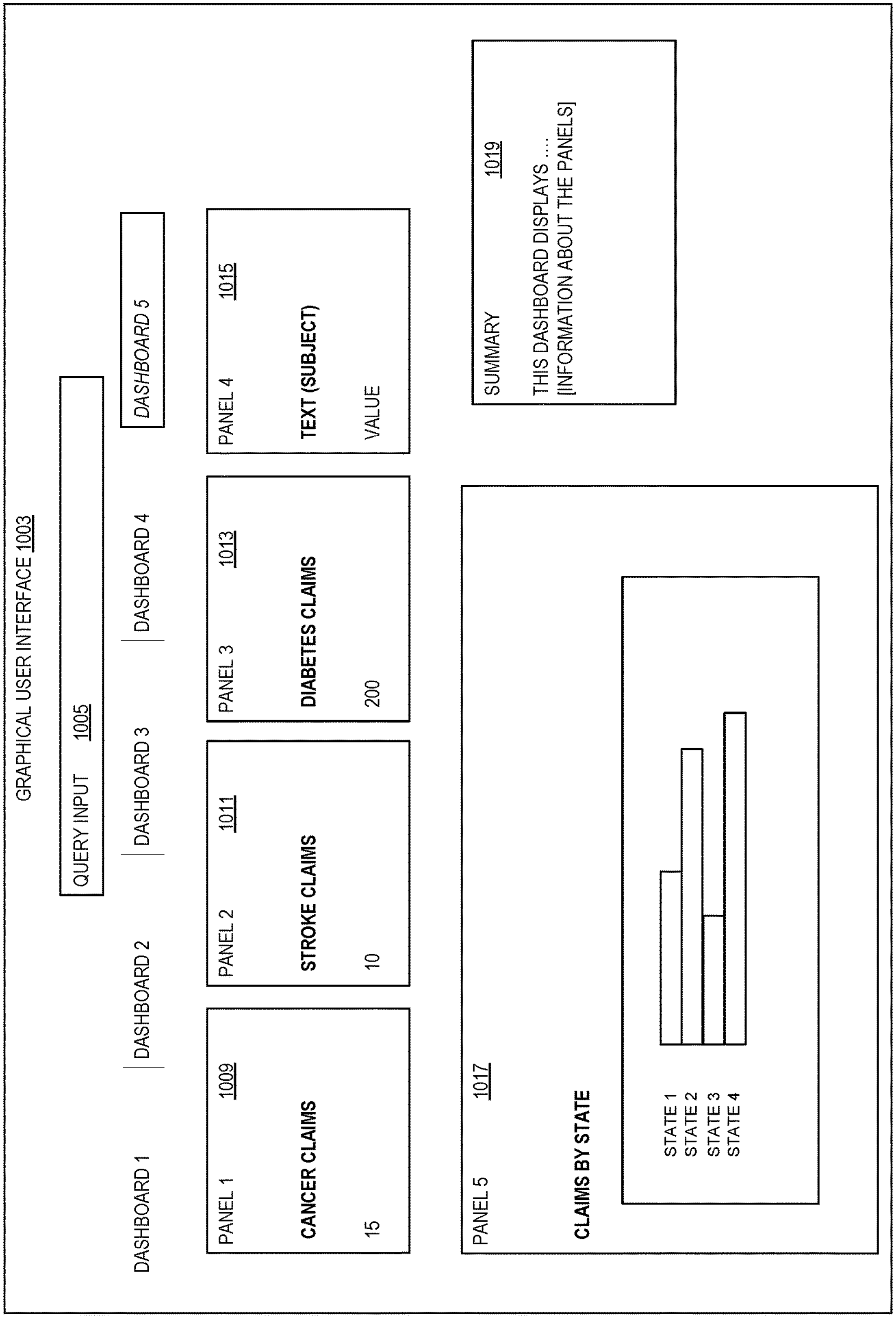
FIG. 10 illustrates examples of a graphical user interface for a dashboard.

FIG. 10 illustrates examples of a graphical user interface for a dashboard. In this illustration, the GUI 1003 provides access to five dashboards with dashboard five being viewed. The dashboard has four panels (panel 11009, panel 1 1011, panel 3 1013, and panel 4 1015) showing information for various claim types. The panels are user configurable in some examples (e.g., a user can select the content for a panel). And one panel (panel 5 1017) provides a visual (chart) of claims by state. In some examples, a dashboard is a read-only snapshot of an analysis. A dashboard preserves the configuration of the analysis at the time it is published, including such things as filtering, parameters, controls, and sort order. The data used for the analysis is not captured as part of the dashboard. When a user views the dashboard, the dashboard reflects the current data in the data sets used by the analysis.

A query input 1005 allows a user to ask a NLQ to the data intelligence service. The NLQ may be for this dashboard or one of the other dashboards. In some examples, the NLQ is for a summary 1019 of the dashboard. The summary 1019 displays information about what is shown in the panels.

Figure 11:
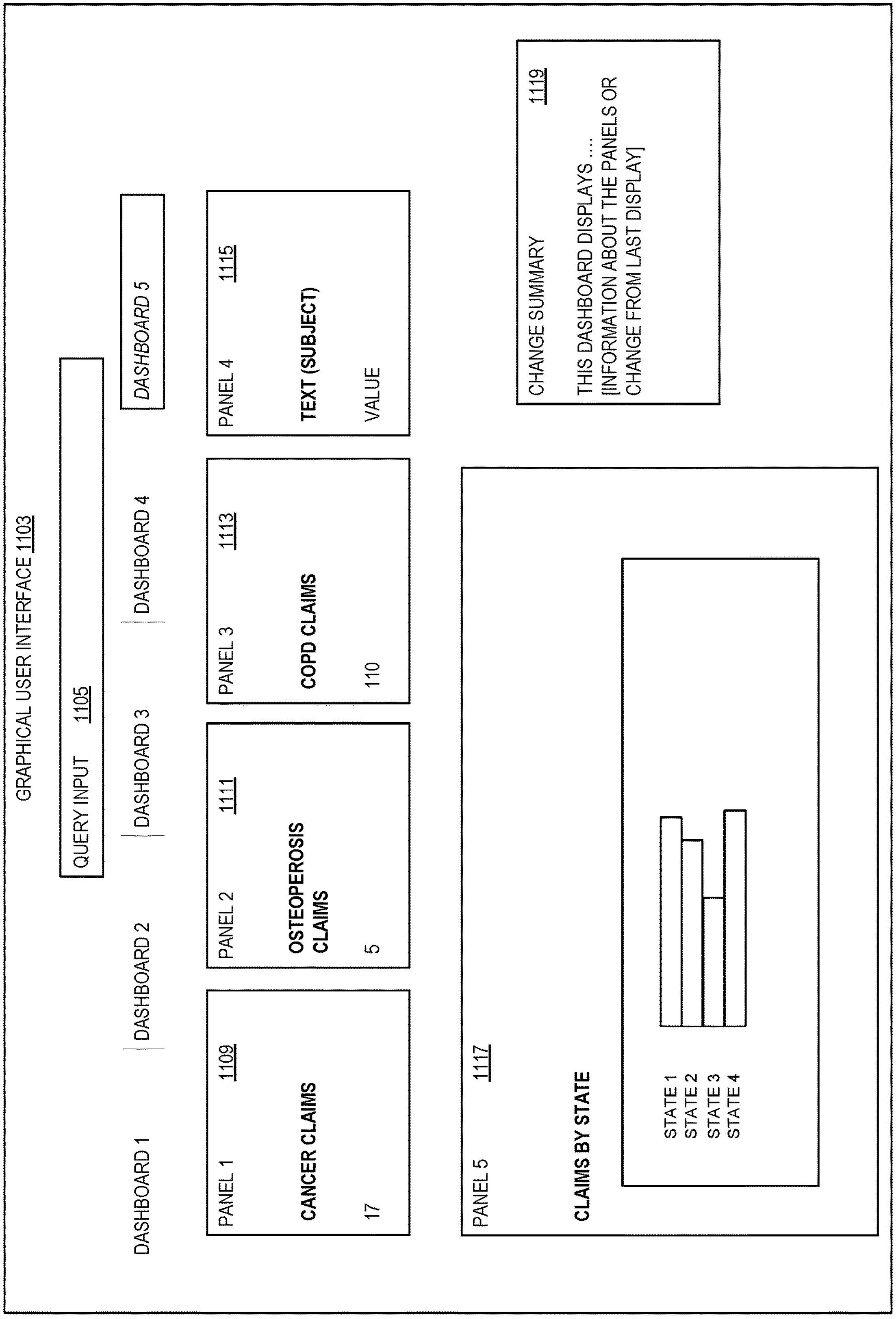
FIG. 11 illustrates examples of a graphical user interface for a dashboard.

FIG. 11 illustrates examples of a graphical user interface for a dashboard. In this illustration, the GUI 1103 provides access to five dashboards with dashboard five being viewed. The dashboard has four panels (panel 1 1109, panel 1 1111, panel 3 1113, and panel 4 1115) showing information for various claim types. And one panel (panel 5 1117) provides a visual (chart) of claims by state. In some examples, a dashboard is a read-only snapshot of an analysis. In this example, some of the panels have changed. In some examples, the numbers have changed and in others different data is shown.

A query input 1105 allows a user to ask a NLQ to the data intelligence service. The NLQ may be for this dashboard or one of the other dashboards. In some examples, the NLQ is for a change summary 1119 of the dashboard. The change summary 1119 displays information about what is shown in the panels that was different than what was displayed in FIG. 10.

Figure 12:
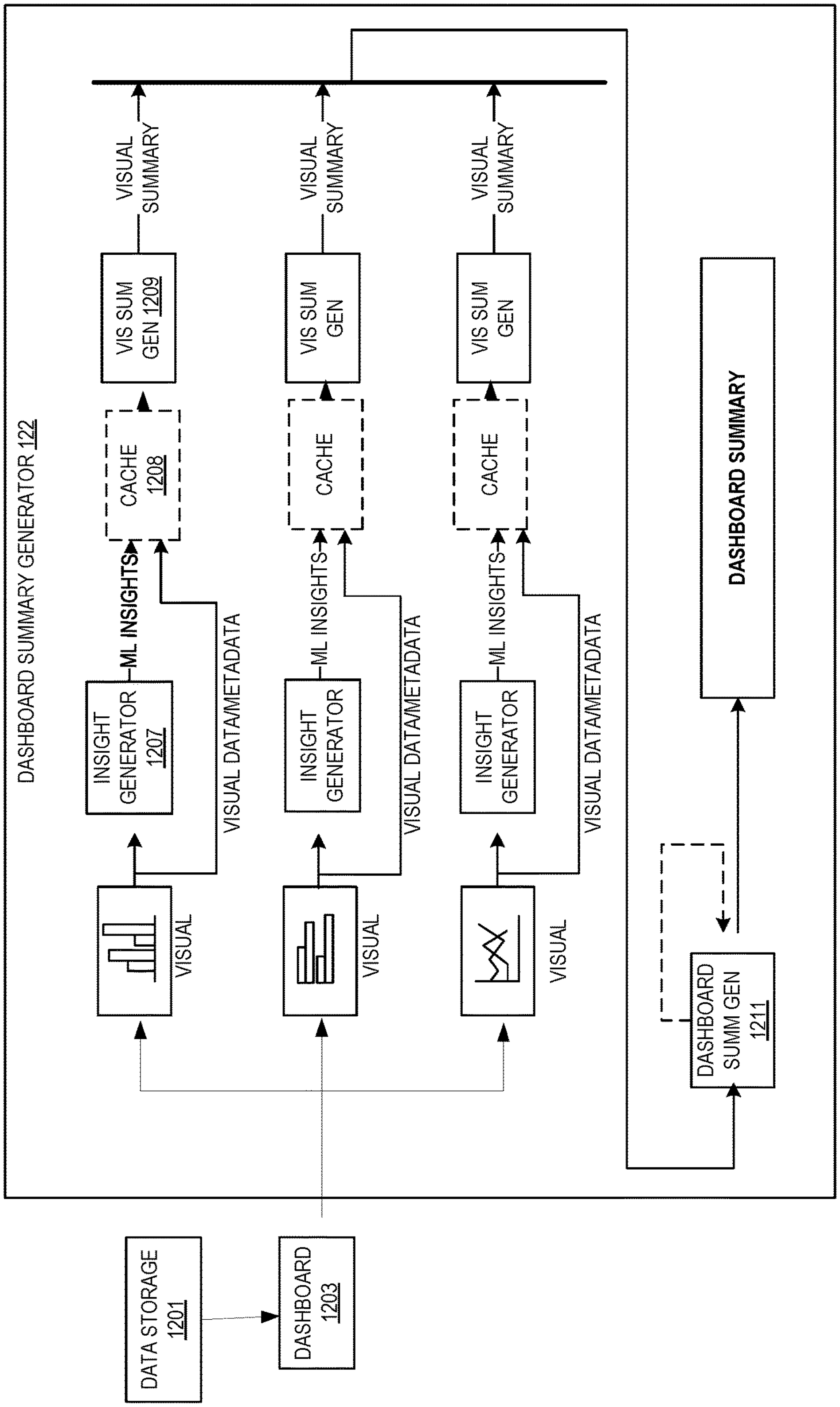
FIG. 12 illustrates examples of a dashboard generator.

FIG. 12 illustrates examples of a dashboard generator. In some examples, this illustrates dashboard summary generator 122. This illustration depicts the generation of a summary for the dashboard. As shown, a dashboard 1203 uses data from a data storage 1201 for the panels of the dashboard. The dashboard summary generator 122 uses the visuals of the dashboard to have an insight generator 1207 generate insights for the visuals. Those insights and visual data (metadata and cell values) are sent to one or more visual summary generators 1209 to predict a visual summary for each visual. In some examples, a visual summary generator is a language model. In some examples, a visual summary generator is a large language model. Note that a single model may be used, multiple instances of the same model, and/or different models per insight generator. In some examples, the ML insights and/or visual data/metadata are cached using cache 1208.

The visual summaries are concatenated and sent to one or more dashboard summary generators 1211 to generate an executive summary. In some examples, one or more dashboard summary generators 1211 are called recursively to refine the summary for better quality. In some examples, a dashboard summary generator 1211 is a language model. In some examples, a dashboard summary generator 1211 is a large language model.

Figure 13A:
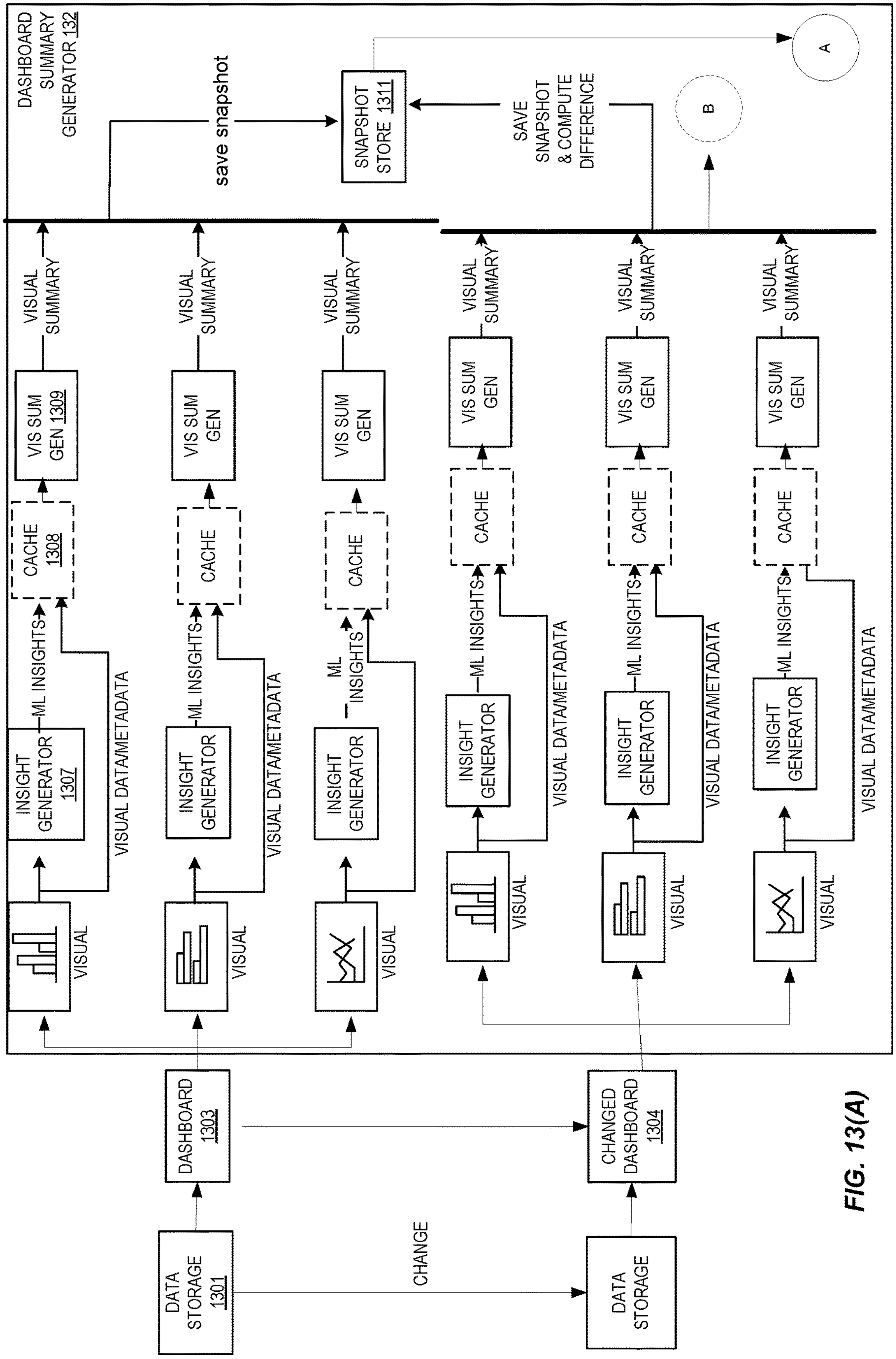
FIGS. 13(A)-(B) illustrate examples of a dashboard generator.
Figure 13B:
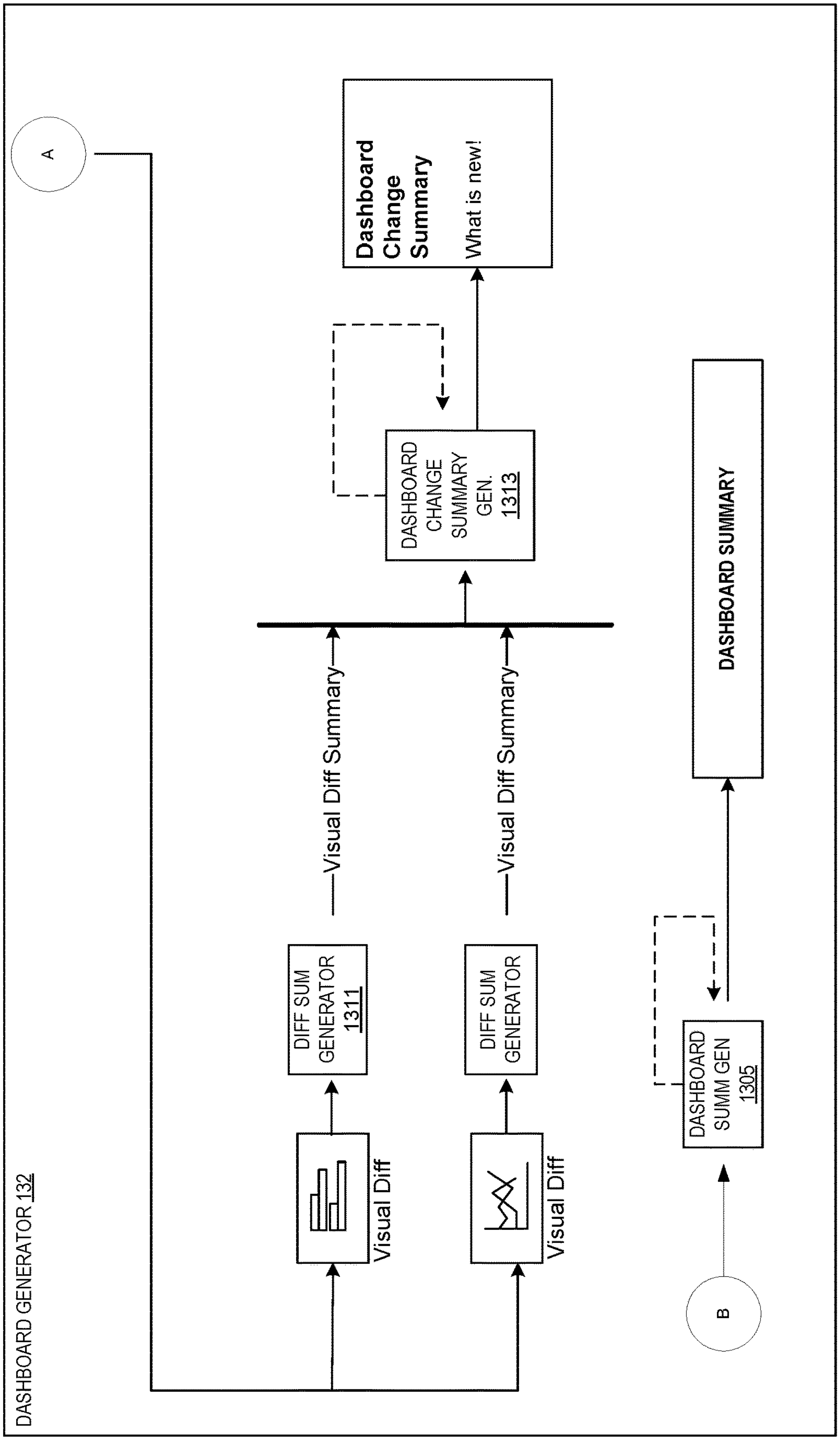

FIGS. 13(A)-(B) illustrate examples of a dashboard generator. In some examples, this illustrates dashboard summary generator 122. This illustration depicts the generation of a change summary for the dashboard. As shown, a dashboard 1303 uses data from a data storage 1301 for the panels of the dashboard. In these illustrations, many different types of models may be used including, but not limited: language models, large language models, Transformer-based models, attention-based models, decoder-based text prediction models, etc.

In the top half of the drawing, the dashboard summary generator 122 uses the visuals of the dashboard to have an insight generator 1307 generate insights for the visuals. Those insights and visual data (metadata and cell values) are sent to one or more visual summary generators 1309 to predict a visual summary for each visual. In some examples, a visual summary generator is a language model. In some examples, a visual summary generator is a large language model. Note that a single model may be used, multiple instances of the same model, and/or different models per insight generator. In some examples, the ML insights and/or visual data/metadata are cached using cache 1308. The visual summaries are stored as a snapshot in snapshot store 1311.

In this example, a change was made to data which generates a new dashboard. In the bottom half of the drawing, the dashboard summary generator 122 uses the visuals of the dashboard to have an insight generator generate insights for the visuals of the changed dashboard 1304. Those insights and visual data (metadata and cell values) are sent to one or more visual summary generators to predict a visual difference summary for each visual. The visual summaries for the changed dashboard are stored as a snapshot in snapshot store 1311 and differences between the two dashboards are computed and output (circle A). The differences are then sent to one or more visual difference summary generators 1311 (e.g., language models), first on each visual, and then consolidated for the entire dashboard using dashboard change summary generator 1313.

In some examples, the visual summaries for the changed dashboard are concatenated and sent (shown as circle B) to a dashboard summary generator 1315 to generate a dashboard summary.

Figure 14:
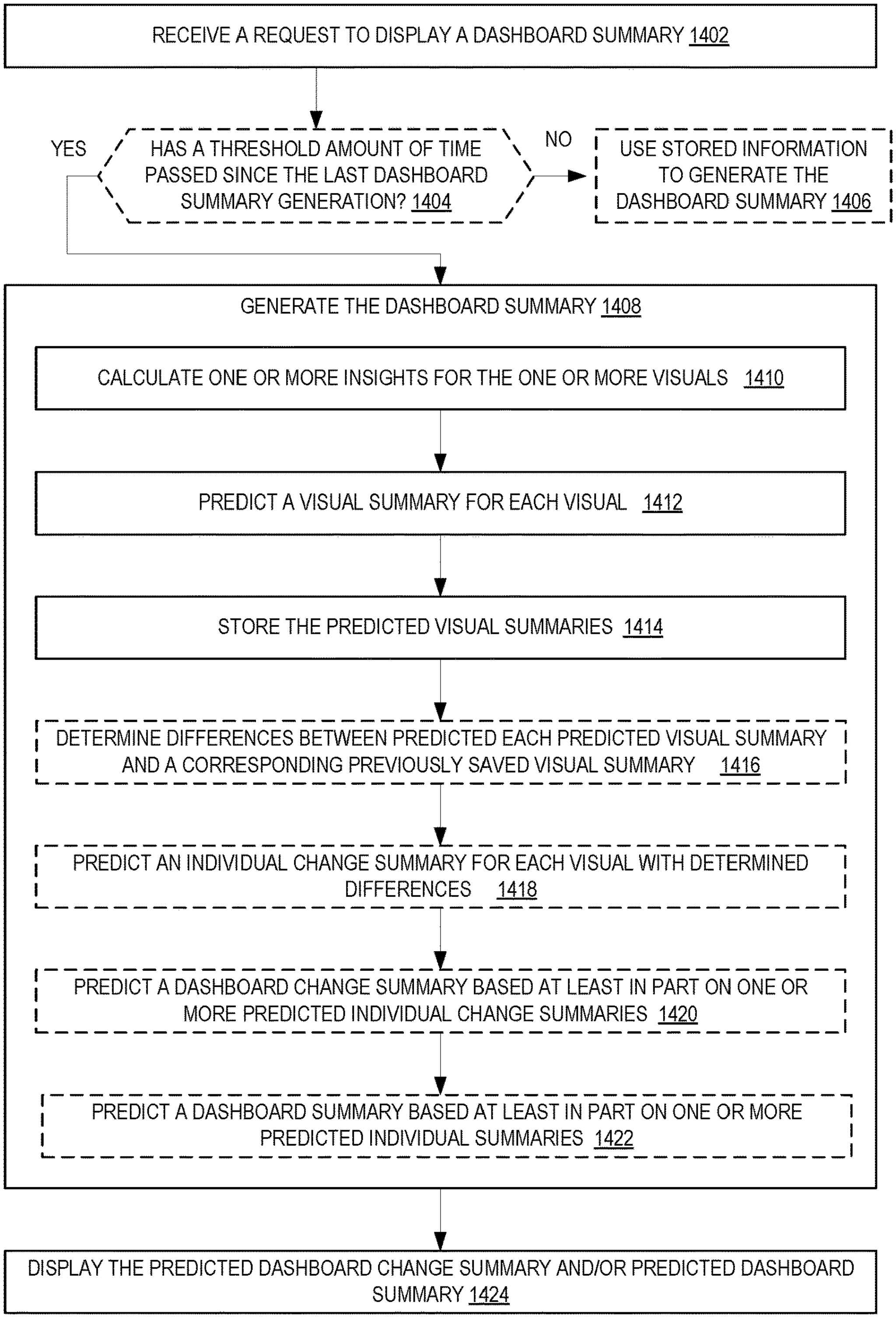
FIG. 14 is a flow diagram illustrating operations of a method for presenting a dashboard according to some examples.

FIG. 14 is a flow diagram illustrating operations of a method for presenting a dashboard according to some examples. Some or all of the operations (or other processes described herein, or variations, and/or combinations thereof) are performed under the control of one or more computing devices configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations are performed by the dashboard summary generator 122 of the other figures.

A request to display a dashboard summary is received at 1402. The request may be made as an NLQ or be an automatic request when a dashboard is viewed. In some examples, the request includes an indication of a particular dashboard to summarize. In some examples, the request is received offline. In some examples, the request is for a dashboard change summary. In some examples, the request is for a dashboard summary. In some examples, the request is for both types of dashboard summaries.

In some examples, a determination of if a threshold amount of time passed since the last dashboard summary generation and/or if there is a change in the dashboard is made at 1404. This check may prevent a redundant summary from being presented or a summary with potential minor changes. Note that in some examples if there are no changes between dashboard viewings the change summary will not that no changes have occurred. Stored information is used to generate the dashboard summary at 1406 when the threshold of time has not passed.

A dashboard summary is generated at 1408. This summary may be a complete summary, a change summary, and/or a summary and changes summary. Note that this generation presumes that a dashboard already exists. If not, then visuals, etc. are generated to populate the dashboard.

One or more insights for the one or more visuals are calculated at 1410. Examples of insight generation have been detailed above. The one or more insights and data about the visuals are used to predict a visual summary for each visual at 1412. The visual summaries are stored at 1414 (and in some cases concatenated).

Differences between each predicted visual summary and a corresponding previously stored predicted visual summary is made at 1416. In some examples, the previously stored predicted summaries are deleted after the difference calculation.

An individual change summary for each visual is predicted using the determined differences at 1418. This summary is generated by one or more LLMs in some examples.

A change dashboard summary based at least in part on one or more predicted individual change summaries is predicted at 1420. This change summary is generated by an LLM in some examples.

In some examples, when there are no changes in the visuals, acts 1418 and 1420 are not performed.

In some examples, a dashboard summary is predicted from the visual summaries predicted at 1412.

The predicted dashboard summary and/or predicted dashboard change summary is/are output at 1422.

Figure 15:
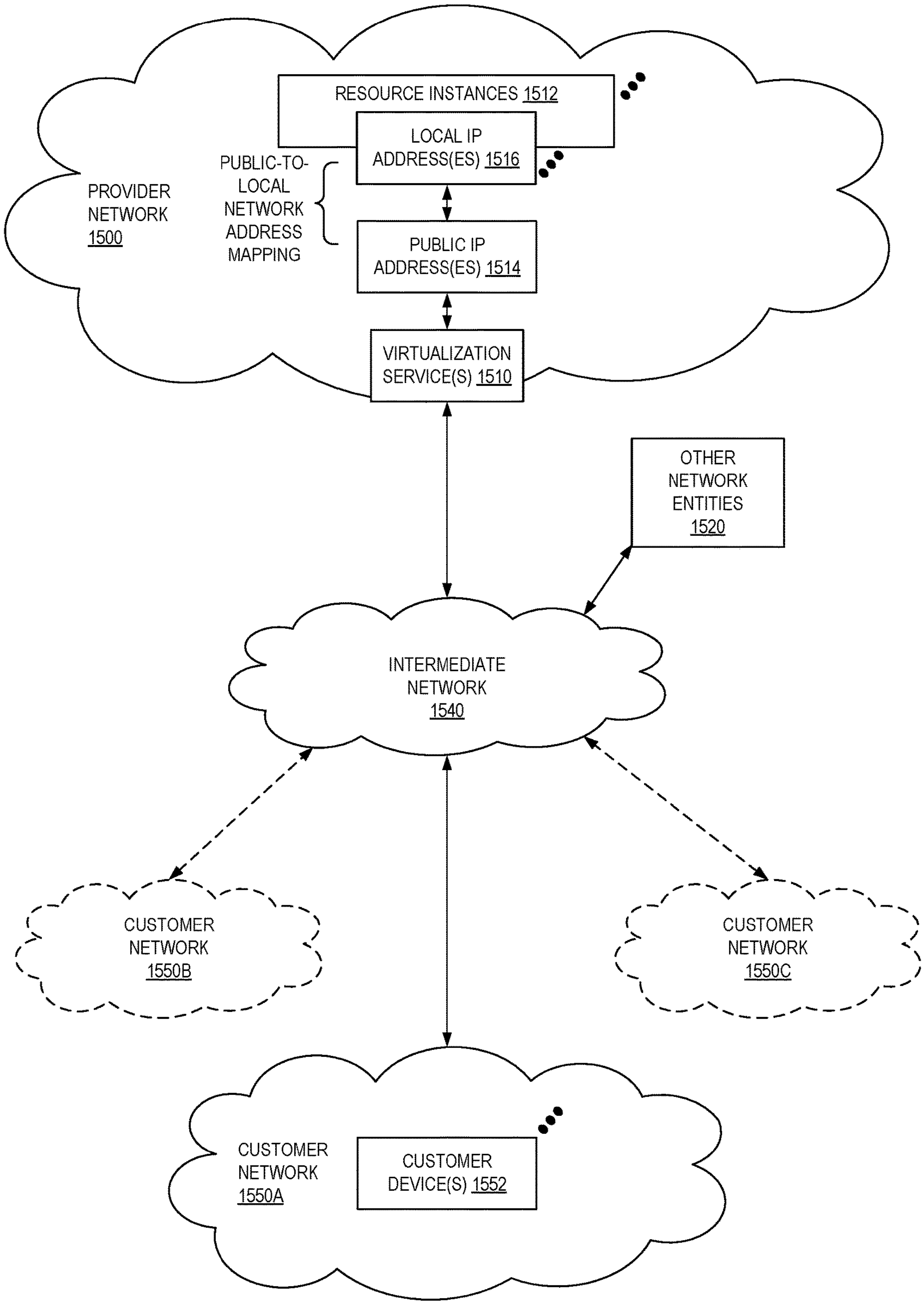
FIG. 15 illustrates an example provider network environment according to some examples.

FIG. 15 illustrates an example provider network (or "service provider system") environment according to some examples. A provider network 1500 can provide resource virtualization to customers via one or more virtualization services 1510 that allow customers to purchase, rent, or otherwise obtain instances 1512 of virtualized resources, including but not limited to computation and storage resources, implemented on devices within the provider network or networks in one or more data centers. Local Internet Protocol (IP) addresses 1516 can be associated with the resource instances 1512; the local IP addresses are the internal network addresses of the resource instances 1512 on the provider network 1500. In some examples, the provider network 1500 can also provide public IP addresses 1514 and/or public IP address ranges (e.g., Internet Protocol version 4 (IPv4) or Internet Protocol version 6 (IPv6) addresses) that customers can obtain from the provider 1500.

Conventionally, the provider network 1500, via the virtualization services 1510, can allow a customer of the service provider (e.g., a customer that operates one or more customer networks 1550A-1550C (or "client networks") including one or more customer device(s) 1552) to dynamically associate at least some public IP addresses 1514 assigned or allocated to the customer with particular resource instances 1512 assigned to the customer. The provider network 1500 can also allow the customer to remap a public IP address 1514, previously mapped to one virtualized computing resource instance 1512 allocated to the customer, to another virtualized computing resource instance 1512 that is also allocated to the customer. Using the virtualized computing resource instances 1512 and public IP addresses 1514 provided by the service provider, a customer of the service provider such as the operator of the customer network(s) 1550A-1550C can, for example, implement customer-specific applications and present the customer's applications on an intermediate network 1540, such as the Internet. Other network entities 1520 on the intermediate network 1540 can then generate traffic to a destination public IP address 1514 published by the customer network(s) 1550A-1550C; the traffic is routed to the service provider data center, and at the data center is routed, via a network substrate, to the local IP address 1516 of the virtualized computing resource instance 1512 currently mapped to the destination public IP address 1514. Similarly, response traffic from the virtualized computing resource instance 1512 can be routed via the network substrate back onto the intermediate network 1540 to the source entity 1520.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and can be mutable within the provider network. Network traffic originating outside the provider network is not directly routed to local IP addresses; instead, the traffic uses public IP addresses that are mapped to the local IP addresses of the resource instances. The provider network can include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses can be assigned by the provider network infrastructure to particular resource instances; these public IP addresses can be referred to as standard public IP addresses, or simply standard IP addresses. In some examples, the mapping of a standard IP address to a local IP address of a resource instance is the default launch configuration for all resource instance types.

At least some public IP addresses can be allocated to or obtained by customers of the provider network 1500; a customer can then assign their allocated public IP addresses to particular resource instances allocated to the customer. These public IP addresses can be referred to as customer public IP addresses, or simply customer IP addresses. Instead of being assigned by the provider network 1500 to resource instances as in the case of standard IP addresses, customer IP addresses can be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 16:
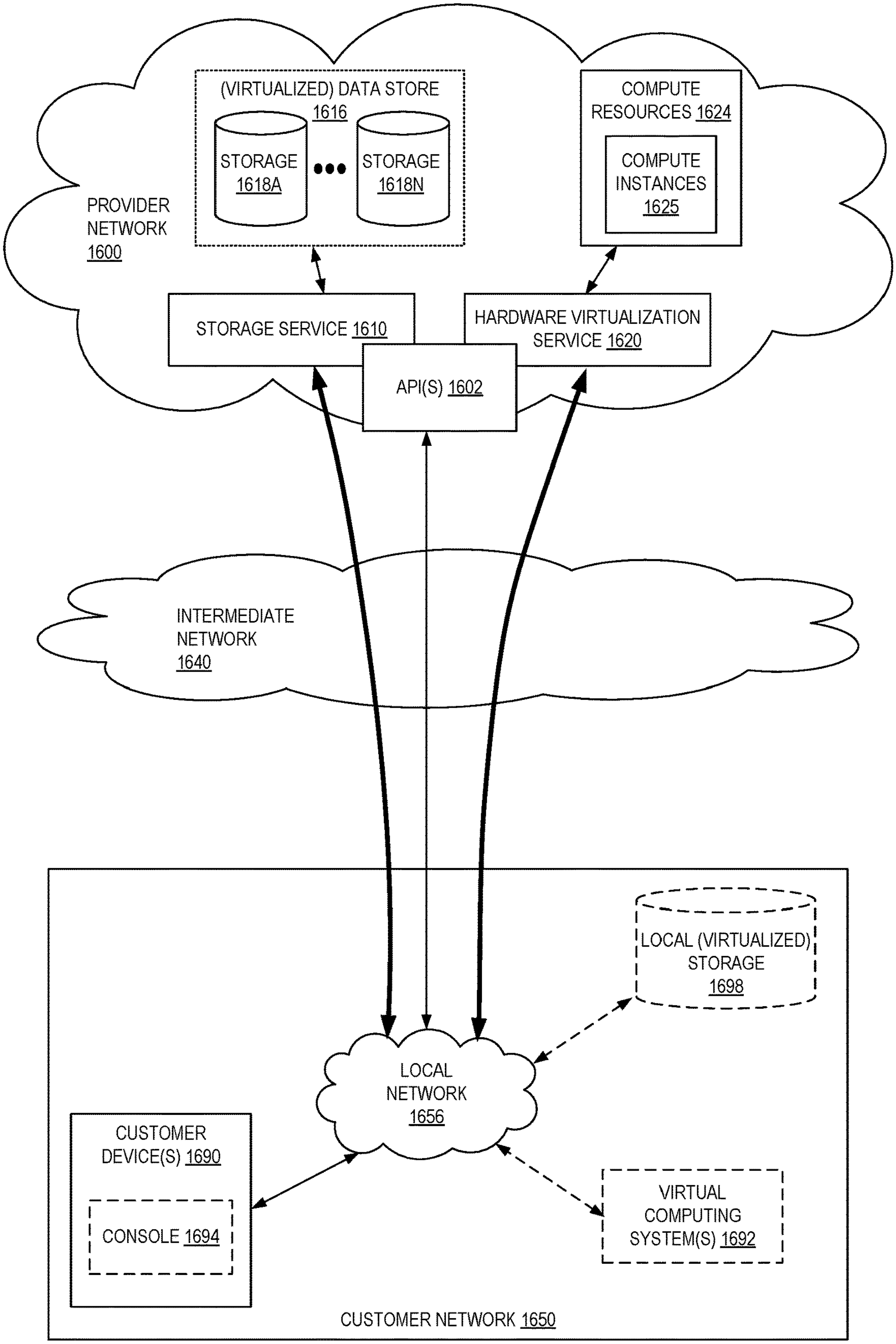
FIG. 16 is a block diagram of an example provider network that provides a storage service and a hardware virtualization service to customers according to some examples.

FIG. 16 is a block diagram of an example provider network environment that provides a storage service and a hardware virtualization service to customers, according to some examples. A hardware virtualization service 1620 provides multiple compute resources 1624 (e.g., compute instances 1625, such as VMs) to customers. The compute resources 1624 can, for example, be provided as a service to customers of a provider network 1600 (e.g., to a customer that implements a customer network 1650). Each computation resource 1624 can be provided with one or more local IP addresses. The provider network 1600 can be configured to route packets from the local IP addresses of the compute resources 1624 to public Internet destinations, and from public Internet sources to the local IP addresses of the compute resources 1624.

The provider network 1600 can provide the customer network 1650, for example coupled to an intermediate network 1640 via a local network 1656, the ability to implement virtual computing systems 1692 via the hardware virtualization service 1620 coupled to the intermediate network 1640 and to the provider network 1600. In some examples, the hardware virtualization service 1620 can provide one or more APIs 1602, for example a web services interface, via which the customer network 1650 can access functionality provided by the hardware virtualization service 1620, for example via a console 1694 (e.g., a web-based application, standalone application, mobile application, etc.) of a customer device 1690. In some examples, at the provider network 1600, each virtual computing system 1692 at the customer network 1650 can correspond to a computation resource 1624 that is leased, rented, or otherwise provided to the customer network 1650.

From an instance of the virtual computing system(s) 1692 and/or another customer device 1690 (e.g., via console 1694), the customer can access the functionality of a storage service 1610, for example via the one or more APIs 1602, to access data from and store data to storage resources 1618A-1618N of a virtual data store 1616 (e.g., a folder or "bucket," a virtualized volume, a database, etc.) provided by the provider network 1600. In some examples, a virtualized data store gateway (not shown) can be provided at the customer network 1650 that can locally cache at least some data, for example frequently accessed or critical data, and that can communicate with the storage service 1610 via one or more communications channels to upload new or modified data from a local cache so that the primary store of data (the virtualized data store 1616) is maintained. In some examples, a user, via the virtual computing system 1692 and/or another customer device 1690, can mount and access virtual data store 1616 volumes via the storage service 1610 acting as a storage virtualization service, and these volumes can appear to the user as local (virtualized) storage 1698.

While not shown in FIG. 16, the virtualization service(s) can also be accessed from resource instances within the provider network 1600 via the API(s) 1602. For example, a customer, appliance service provider, or other entity can access a virtualization service from within a respective virtual network on the provider network 1600 via the API(s) 1602 to request allocation of one or more resource instances within the virtual network or within another virtual network.

Illustrative Systems

Figure 17:
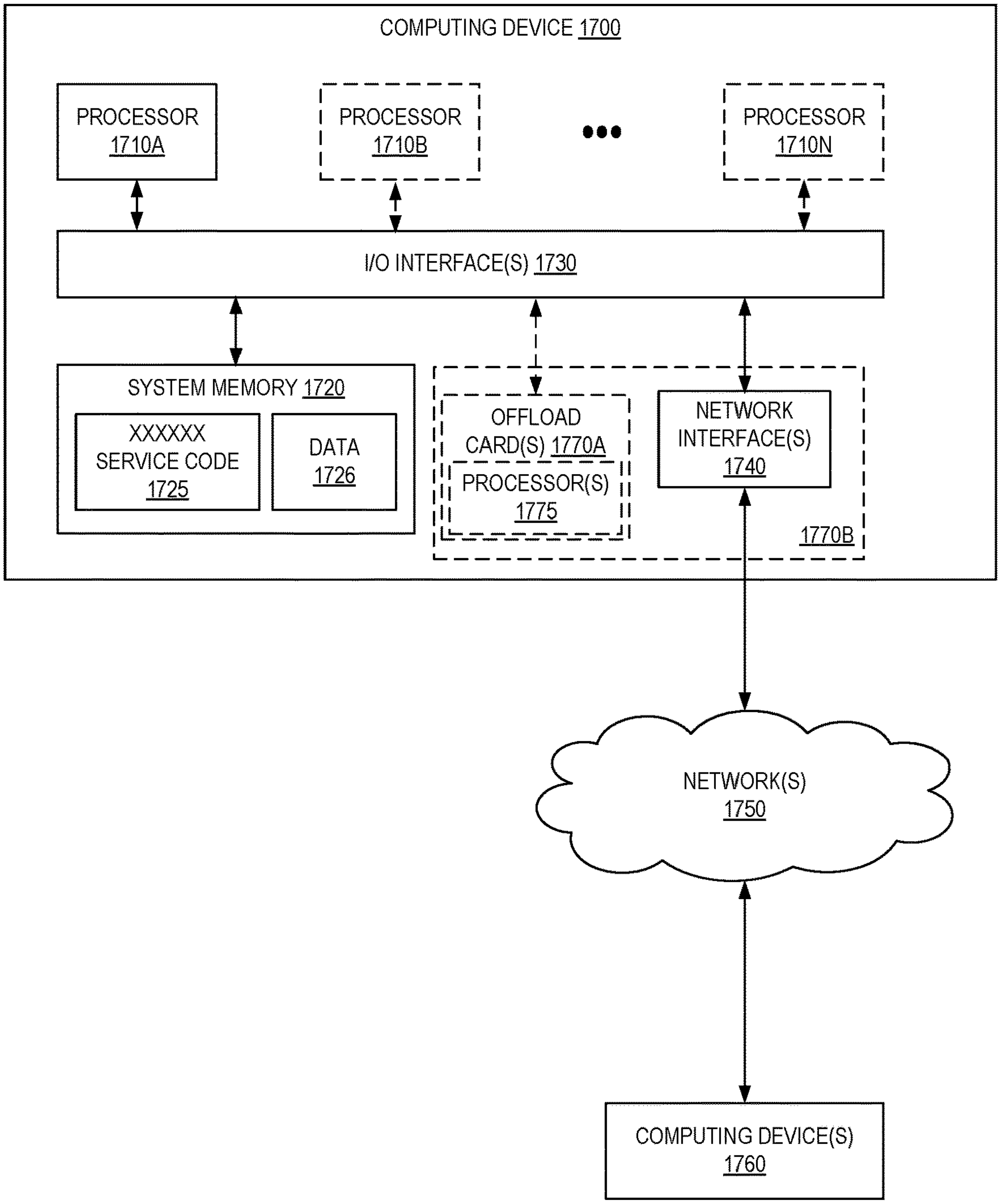
FIG. 17 is a block diagram illustrating an example computing device that can be used in some examples.

In some examples, a system that implements a portion or all of the techniques described herein can include a general-purpose computer system, such as the computing device 1700 (also referred to as a computing system or electronic device) illustrated in FIG. 17, that includes, or is configured to access, one or more computer-accessible media. In the illustrated example, the computing device 1700 includes one or more processors 1710 coupled to a system memory 1720 via an input/output (I/O) interface 1730. The computing device 1700 further includes a network interface 1740 coupled to the I/O interface 1730. While FIG. 17 shows the computing device 1700 as a single computing device, in various examples the computing device 1700 can include one computing device or any number of computing devices configured to work together as a single computing device 1700.

In various examples, the computing device 1700 can be a uniprocessor system including one processor 1710, or a multiprocessor system including several processors 1710 (e.g., two, four, eight, or another suitable number). The processor(s) 1710 can be any suitable processor(s) capable of executing instructions. For example, in various examples, the processor(s) 1710 can be general-purpose or embedded processors implementing any of a variety of instruction set architectures (ISAs), such as the x86, ARM, PowerPC, SPARC, or MIPS ISAs, or any other suitable ISA. In multiprocessor systems, each of the processors 1710 can commonly, but not necessarily, implement the same ISA.

The system memory 1720 can store instructions and data accessible by the processor(s) 1710. In various examples, the system memory 1720 can be implemented using any suitable memory technology, such as random-access memory (RAM), static RAM (SRAM), synchronous dynamic RAM (SDRAM), nonvolatile/Flash-type memory, or any other type of memory. In the illustrated example, program instructions and data implementing one or more desired functions, such as those methods, techniques, and data described above, are shown stored within the system memory 1720 as data intelligence service code 1725 (e.g., executable to implement, in whole or in part, the data intelligence service 110) and data 1726.

In some examples, the I/O interface 1730 can be configured to coordinate I/O traffic between the processor 1710, the system memory 1720, and any peripheral devices in the device, including the network interface 1740 and/or other peripheral interfaces (not shown). In some examples, the I/O interface 1730 can perform any necessary protocol, timing, or other data transformations to convert data signals from one component (e.g., the system memory 1720) into a format suitable for use by another component (e.g., the processor 1710). In some examples, the I/O interface 1730 can include support for devices attached through various types of peripheral buses, such as a variant of the Peripheral Component Interconnect (PCI) bus standard or the Universal Serial Bus (USB) standard, for example. In some examples, the function of the I/O interface 1730 can be split into two or more separate components, such as a north bridge and a south bridge, for example. Also, in some examples, some or all of the functionality of the I/O interface 1730, such as an interface to the system memory 1720, can be incorporated directly into the processor 1710.

The network interface 1740 can be configured to allow data to be exchanged between the computing device 1700 and other computing devices 1760 attached to a network or networks 1750, such as other computer systems or devices as illustrated in FIG. 1, for example. In various examples, the network interface 1740 can support communication via any suitable wired or wireless general data networks, such as types of Ethernet network, for example. Additionally, the network interface 1740 can support communication via telecommunications/telephony networks, such as analog voice networks or digital fiber communications networks, via storage area networks (SANs), such as Fibre Channel SANs, and/or via any other suitable type of network and/or protocol.

In some examples, the computing device 1700 includes one or more offload cards 1770A or 1770B (including one or more processors 1775, and possibly including the one or more network interfaces 1740) that are connected using the I/O interface 1730 (e.g., a bus implementing a version of the Peripheral Component Interconnect-Express (PCI-E) standard, or another interconnect such as a QuickPath interconnect (QPI) or UltraPath interconnect (UPI)). For example, in some examples the computing device 1700 can act as a host electronic device (e.g., operating as part of a hardware virtualization service) that hosts compute resources such as compute instances, and the one or more offload cards 1770A or 1770B execute a virtualization manager that can manage compute instances that execute on the host electronic device. As an example, in some examples the offload card(s) 1770A or 1770B can perform compute instance management operations, such as pausing and/or un-pausing compute instances, launching and/or terminating compute instances, performing memory transfer/copying operations, etc. These management operations can, in some examples, be performed by the offload card(s) 1770A or 1770B in coordination with a hypervisor (e.g., upon a request from a hypervisor) that is executed by the other processors 1710A-1710N of the computing device 1700. However, in some examples the virtualization manager implemented by the offload card(s) 1770A or 1770B can accommodate requests from other entities (e.g., from compute instances themselves), and cannot coordinate with (or service) any separate hypervisor.

In some examples, the system memory 1720 can be one example of a computer-accessible medium configured to store program instructions and data as described above. However, in other examples, program instructions and/or data can be received, sent, or stored upon different types of computer-accessible media. Generally speaking, a computer-accessible medium can include any non-transitory storage media or memory media such as magnetic or optical media, e.g., disk or DVD/CD coupled to the computing device 1700 via the I/O interface 1730. A non-transitory computer-accessible storage medium can also include any volatile or non-volatile media such as RAM (e.g., SDRAM, double data rate (DDR) SDRAM, SRAM, etc.), read only memory (ROM), etc., that can be included in some examples of the computing device 1700 as the system memory 1720 or another type of memory. Further, a computer-accessible medium can include transmission media or signals such as electrical, electromagnetic, or digital signals, conveyed via a communication medium such as a network and/or a wireless link, such as can be implemented via the network interface 1740.

Various examples discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most examples use at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In examples using a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also can be capable of executing programs or scripts in response requests from user devices, such as by executing one or more Web applications that can be implemented as one or more scripts or programs written in any programming language, such as Java®, C, C#or C++, or any scripting language, such as Perl, Python, PHP, or TCL, as well as combinations thereof. The server(s) can also include database servers, including without limitation those commercially available from Oracle®, Microsoft®, Sybase®, IBM®, etc. The database servers can be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of examples, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system can also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate examples can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various examples.

In the preceding description, various examples are described. For purposes of explanation, specific configurations and details are set forth in order to provide a thorough understanding of the examples. However, it will also be apparent to one skilled in the art that the examples can be practiced without the specific details. Furthermore, well-known features can be omitted or simplified in order not to obscure the example being described.

Bracketed text and blocks with dashed borders (e.g., large dashes, small dashes, dot-dash, and dots) are used herein to illustrate optional aspects that add additional features to some examples. However, such notation should not be taken to mean that these are the only options or optional operations, and/or that blocks with solid borders are not optional in certain examples.

Reference numerals with suffix letters (e.g., 1618A-1618N) can be used to indicate that there can be one or multiple instances of the referenced entity in various examples, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters might or might not have the same number of instances in various examples.

References to "one example," "an example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given example requires at least one of A, at least one of B, and at least one of C to each be present.

As used herein, the term "based on" (or similar) is an open-ended term used to describe one or more factors that affect a determination or other action. It is to be understood that this term does not foreclose additional factors that may affect a determination or action. For example, a determination may be solely based on the factor(s) listed or based on the factor(s) and one or more additional factors. Thus, if an action A is "based on" B, it is to be understood that B is one factor that affects action A, but this does not foreclose the action from also being based on one or multiple other factors, such as factor C. However, in some instances, action A may be based entirely on B.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C.

Further, the words "may" or "can" are used in a permissive sense (i.e., meaning having the potential to), rather than the mandatory sense (i.e., meaning must). The words "include," "including," and "includes" are used to indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for the nouns that they precede, and do not imply any type of ordering (e.g., spatial, temporal, logical, etc.) unless such an ordering is otherwise explicitly indicated. Similarly, the values of such numeric labels are generally not used to indicate a required amount of a particular noun in the claims recited herein, and thus a "fifth" element generally does not imply the existence of four other elements unless those elements are explicitly included in the claim or it is otherwise made abundantly clear that they exist.

The specification and drawings are, accordingly, to be regarded in an illustrative rather than a restrictive sense. It will, however, be evident that various modifications and changes can be made thereunto without departing from the broader scope of the disclosure as set forth in the claims.

What is claimed is:

1. A computer-implemented method comprising:

receiving a natural language request to generate a multimedia presentation of a dataset;

predicting a domain for the dataset based on the natural language request, wherein the domain indicates a subject-matter category associated with the dataset inferred from the natural language request and contextual dataset information;

calculating insights regarding the dataset based on the natural language request, wherein the insights include one or more computed measures comprising statistical measures, aggregations, trends, or anomaly detections;

generating an outline for the multimedia presentation using at least one machine learning language model, the outline being generated according to a schema and using one or more of text from the natural language request, the insights regarding the dataset, and the domain, wherein the schema defines a structured format for the outline comprising a collection of sections and corresponding structured data entries specifying constraints for at least one of content, visuals, or objectives of each section;

predicting content for the multimedia presentation of the dataset using at least one machine learning language model based at least in part on the outline, the domain, and the text from the natural language request, wherein the content includes one or more of a visual and text for each section of the outline; and presenting the generated content as the multimedia presentation.

2. The computer-implemented method of claim 1, wherein the outline for the multimedia presentation is generated by using at least one language model to predict one or more paragraphs of text that describe the multimedia presentation and at least one language model to generate an outline using the predicted one or more paragraphs.

3. The computer-implemented method of claim 1, wherein the outline schema comprises a section number and title, an objective, an indication of a visual for the section, and a content string example.

4. A computer-implemented method comprising:

receiving a request to generate a multimedia presentation of a dataset;

generating an outline for the multimedia presentation using at least one machine learning language model, the outline being generated according to a schema and using one or more of text from the request, insights regarding the dataset, and domain information about the dataset, wherein the domain information indicates a subject-matter category associated with the dataset inferred from at least the request and contextual dataset information, and wherein the schema defines a structured format for the outline comprising a collection of sections and corresponding structured data entries that constrain generation of at least one of content, visuals, or objectives for each section;

predicting content for the multimedia presentation of the dataset using at least one machine learning language model based at least in part on the outline, the domain information for the dataset, and the text from the request, wherein the content includes one or more of a visual and text for each section of the outline; and presenting the generated content as the multimedia presentation.

5. The computer-implemented method of claim 4, wherein at least one of the at least one machine learning language model is a large language model.

6. The computer-implemented method of claim 4, wherein the request is a natural language request.

7. The computer-implemented method of claim 4, further comprising:

predicting the domain for the dataset.

8. The computer-implemented method of claim 4, wherein the outline for the multimedia presentation is generated by using at least one language model to predict one or more paragraphs of text that describe the multimedia presentation and at least one language model to generate an outline using the predicted one or more paragraphs.

9. The computer-implemented method of claim 4, wherein the outline schema comprises one or more of a section number and title, an objective, an indication of a visual for the section, a description of a visual, and a content string example.

10. The computer-implemented method of claim 9, wherein a visual for the multimedia presentation is selected based at least in part on the indication of a visual for a section.

11. The computer-implemented method of claim 9, wherein the predicted content for a section of the multimedia presentation includes a visual and text predicted from the visual and insights.

12. The computer-implemented method of claim 9, wherein the predicted content for a section of the multimedia presentation includes no visual and the text is predicted from a description of a visual or any other information from the request.

13. The computer-implemented method of claim 9, wherein the predicted content for a section of the multimedia presentation includes no visual and the text is predicted from information in the outline for the section.

14. The computer-implemented method of claim 4, wherein the request includes one or more of: natural language query (NLQ) text, an indication of one or more datasets to use, an indication of one or more visuals to use, an indication of a number of sections to generate for the presentation, an outline of the presentation, an indication of a style, a title, an indication of if a visual should be included in a section, a theme, data source(s), section information, or an indication of an outline to use.

15. The computer-implemented method of claim 4, further comprising:

receiving a request to edit the generated multimedia presentation, wherein the request includes an indication to update a section of the generated multimedia presentation by performing at least one act by having a machine learning model replace text of the section with new text, insert additional text, continue writing text, make the text longer, make the text shorter, or make the text bullet point;

applying the machine learning model to perform the at least one act.

16. A system comprising:

a first one or more computing devices to implement a data storage service in a multi-tenant provider network; and a second one or more computing devices to implement a presentation generation service in the multi-tenant provider network, the presentation generation service including instructions that upon execution cause the presentation generation service to:

receive a natural language request to generate a multimedia presentation of a dataset stored by the data storage service;

generate an outline for the multimedia presentation using at least one machine learning language model, the outline being generated according to a schema and using one or more of text from the natural language request, insights regarding the dataset, and domain information for the dataset, wherein the domain information indicates a subject-matter category associated with the dataset inferred from at least the natural language request and contextual dataset information, and wherein the schema defines a structured format for the outline comprising a collection of sections and corresponding structured data entries that constrain generation of at least one of content, visuals, or objectives for each section;

predict content for the multimedia presentation of the dataset using at least one machine learning language model based at least in part on the outline, the domain information for the dataset, and the text from the natural language request, wherein the content includes one or more of a visual and text for each section of the outline; and present the generated content as the multimedia presentation.

17. The system of claim 16, wherein the instructions further cause the presentation generation service to:

generate, using natural language query processing, an intent representation based on the natural language request, the intent representation specifying at least one of a dataset identifier, a metric, or a filter; and translate the intent representation into a structured query to obtain at least a portion of the insights regarding the dataset.

18. The system of claim 16, wherein the outline for the multimedia presentation is generated by using at least one language model to predict one or more paragraphs of text that describe the multimedia presentation and at least one language model to generate an outline using the predicted one or more paragraphs.

19. The system of claim 16, wherein the outline schema comprises one or more of a section number and title, an objective, an indication of a visual for the section, a description of a visual, and a content string example.

20. The system of claim 19, wherein a visual for the multimedia presentation is selected based at least in part on the indication of a visual for a section.

* * * * *